(12) United States Patent
Kang

(10) Patent No.: US 12,159,049 B2
(45) Date of Patent: Dec. 3, 2024

(54) MEMORY SYSTEM AND OPERATING METHOD THEREOF

(71) Applicant: SK hynix Inc., Icheon-si (KR)

(72) Inventor: Min Gu Kang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 735 days.

(21) Appl. No.: 17/328,676

(22) Filed: May 24, 2021

(65) Prior Publication Data
US 2022/0171561 A1 Jun. 2, 2022

(30) Foreign Application Priority Data
Nov. 30, 2020 (KR) .......................... 10-2020-0164567

(51) Int. Cl.
*G06F 12/00* (2006.01)
*G06F 3/06* (2006.01)

(52) U.S. Cl.
CPC .......... *G06F 3/0647* (2013.01); *G06F 3/0619* (2013.01); *G06F 3/0656* (2013.01); *G06F 3/0659* (2013.01); *G06F 3/0688* (2013.01)

(58) Field of Classification Search
CPC .... G06F 3/0647; G06F 3/0617; G06F 3/0656; G06F 3/0659
USPC ........................................................ 711/154
See application file for complete search history.

(56) References Cited

U.S. PATENT DOCUMENTS

| 2004/0210731 | A1* | 10/2004 | Chatterjee | G06F 3/0671 |
| | | | | 711/114 |
| 2006/0112221 | A1* | 5/2006 | Hu | G06F 11/3476 |
| | | | | 711/114 |
| 2016/0371019 | A1* | 12/2016 | Kang | G06F 12/1009 |
| 2020/0320019 | A1* | 10/2020 | Byun | G06F 12/10 |

FOREIGN PATENT DOCUMENTS

| KR | 10-2018-0023190 | 3/2018 |
| KR | 10-2020-0021821 | 3/2020 |

* cited by examiner

*Primary Examiner* — Mohamed M Gebril
(74) *Attorney, Agent, or Firm* — Weaver Austin Villeneuve & Sampson LLP

(57) ABSTRACT

A memory system includes a first semiconductor memory device, a second semiconductor memory device, and a controller for controlling operations thereof. Each of the first and second semiconductor memory devices includes a normal area and a preliminary area. The controller is configured to determine a data migration operation on target data stored in the first semiconductor memory device and in response thereto control the first semiconductor memory device to read the target data, generate migration data including a plurality of group migration complete data indicating that the data migration operation has been partially completed based on the target data, and control the second semiconductor memory device to program the migration data in the preliminary area of the second semiconductor memory device.

17 Claims, 20 Drawing Sheets

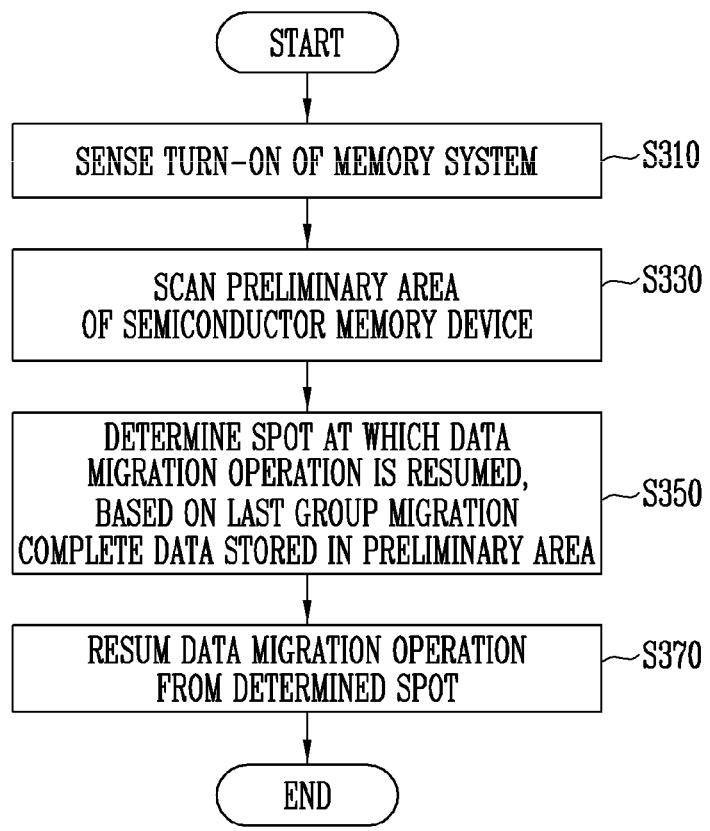

MEMORY SYSTEM AND OPERATING METHOD THEREOF

CROSS-REFERENCE TO RELATED APPLICATION

The present application claims priority under 35 U.S.C. § 119(a) to Korean patent application number 10-2020-0164567, filed on Nov. 30, 2020, which is incorporated herein by reference in its entirety.

BACKGROUND

1. Technical Field

The present disclosure generally relates to an electronic device, and more particularly, to a memory system and an operating method thereof.

2. Related Art

A memory system may include at least one semiconductor memory device and a controller. The semiconductor memory device may be formed in a two-dimensional structure in which strings are arranged horizontally to a semiconductor substrate, or be formed in a three-dimensional structure in which strings are arranged vertically to a semiconductor substrate. A three-dimensional memory device is a semiconductor memory device devised so as to overcome the limit of degree of integration in two-dimensional semiconductor memory devices, and may include a plurality of memory cells vertically stacked above a semiconductor substrate. The controller may control an operation of the semiconductor memory device.

SUMMARY

Embodiments of the present disclosure provide a memory system capable of stably performing a data migration operation even when a power supply is interrupted, and methods of operating the memory system.

In accordance with an aspect of the present disclosure, there is provided a memory system including: first and second semiconductor memory devices each including a normal area and a preliminary area; and a controller configured to control operations of the first and second semiconductor memory devices. The controller may determine a data migration operation on target data stored in the first semiconductor memory device, and in response thereto control the first semiconductor memory device to read the target data, generate, based on the target data, migration data including a plurality of group migration complete data indicating that the data migration operation has been partially completed, and control the second semiconductor memory device to program the migration data in the preliminary area of the second semiconductor memory device.

In one embodiment, the target data may include a plurality of partial data. The controller may group the plurality of partial data into a plurality of groups, and generate the migration data by inserting group migration complete data corresponding to each of the plurality of groups into the target data.

In one embodiment, a group migration complete data among the plurality of group migration complete data may include: a dedicated data pattern; and a number of a group corresponding to the one group migration complete data.

In one embodiment, a write operation corresponding to a write request received from a host may be performed in the normal area, and a write operation corresponding to global wear leveling internally determined in the memory system may be performed in the preliminary area.

In one embodiment, the controller may scan the preliminary area of the second semiconductor memory device by detecting a turn-on of the memory system, and determine a spot at which the data migration operation is to be resumed, based on at least one group migration complete data stored in the preliminary area.

In one embodiment, the controller may determine a next data of a group corresponding to the last group migration complete data as the spot at which the data migration operation is to be resumed.

In one embodiment, the controller may control the first and second semiconductor memory devices to resume the data migration operation, based on the determined spot.

In one embodiment, the controller may include: a memory interface configured to transfer commands and data to the first and second semiconductor memory devices, and receive data from the first and second semiconductor memory devices; a buffer memory configured to temporarily store the read target data; and a processing unit configured to control the data migration operation.

In one embodiment, the controller may include: a first flash translation layer core configured to transfer first commands and first data to the first semiconductor memory device, and receive data from the first semiconductor memory device; a second flash translation layer core configured to transfer second commands and second data to the second semiconductor memory device, and receive data from the second semiconductor memory device; and a host interface layer core configured to control the first flash translation layer core and the second flash translation layer core, interface an external host and the memory system, and control the data migration operation.

In accordance with another aspect of the present disclosure, there is provided a method for operating a memory system including first and second semiconductor memory devices each including a normal area and a preliminary area. The method may include: determining target data which becomes a target of a data migration operation among data stored in the first semiconductor memory device; reading the target data from the first semiconductor memory device; and generating, based on the target data, migration data including a plurality of group migration complete data indicating that the data migration operation has been partially completed.

In one embodiment, the target data may include a plurality of partial data. Generating the migration data may include: grouping the plurality of partial data into a plurality of groups; and inserting one of the plurality of group migration complete data corresponding to each of the plurality of groups into the target data to generate the migration data.

In one embodiment, a group migration complete data among the plurality of group migration complete data may include: a dedicated data pattern; and a group number corresponding to the one group migration complete data.

In one embodiment, the method may further include storing the migration data in the preliminary area of the second semiconductor memory device.

The normal area may be an area in which a write operation corresponding to a write request received from a host is performed, and the preliminary area may be an area in which a write operation corresponding to global wear leveling internally determined in the memory system is performed.

In accordance with still another aspect of the present disclosure, there is provided a method of operating a memory system including first and second semiconductor memory devices each including a normal area and a preliminary area. The method may include: detecting a turn-on of the memory system; determining that a data migration operation of target data has been performed from the first semiconductor memory device to the second semiconductor memory device, before the memory system has been turned off; scanning the preliminary area of the second semiconductor memory device; and determining a spot at which the data migration operation is to be resumed, based on at least one group migration complete data stored in the preliminary area. The target data includes a plurality of partial data that are grouped into a plurality of groups, and the group migration complete data indicates that the data migration operation on the target data has been partially completed.

The normal area may be an area in which a write operation corresponding to a write request received from a host is performed, and the preliminary area may be an area in which a write operation corresponding to global wear leveling internally determined in the memory system is performed.

In one embodiment, determining the spot at which the data migration operation is to be resumed, based on the at least one group migration complete data stored in the preliminary area, may include checking data migration of a group corresponding to last group migration complete data among the at least one group migration complete data, and determining next data of a group corresponding to the last group migration complete data as the spot at which the data migration operation is to be resumed.

The method may further include resuming the data migration operation from the determined spot.

BRIEF DESCRIPTION OF THE DRAWINGS

Exemplary embodiments will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the exemplary embodiments to those skilled in the art.

In the drawing figures, the dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 16 is a flowchart illustrating a method of operating a memory system to recover a data migration operation when SPO occurs during the data migration operation.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and the inventive concept should not be construed as being limited to the exemplary embodiments set forth herein.

Figure 1:
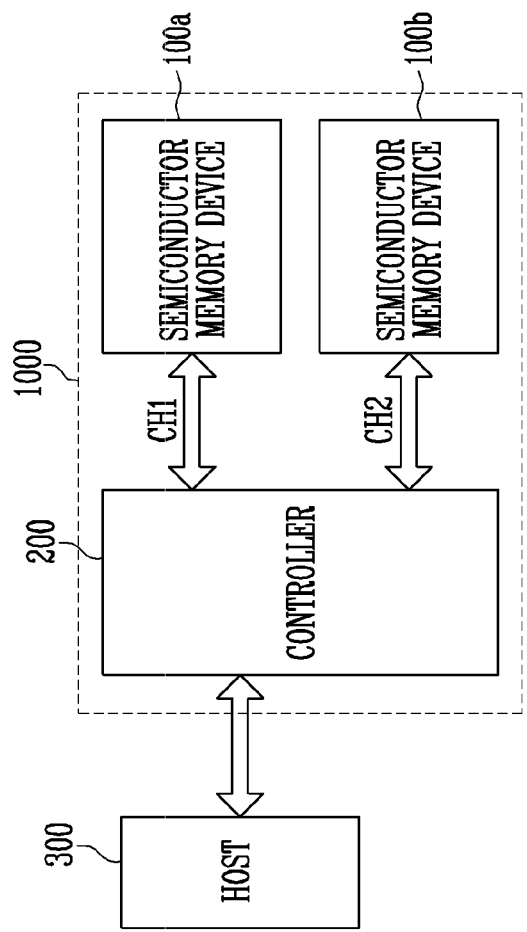
FIG. 1 is a block diagram illustrating a memory system according to an embodiment of the present disclosure.

FIG. 1 is a block diagram illustrating a memory system 1000 according to an embodiment of the present disclosure.

Referring to FIG. 1, the memory system 1000 includes semiconductor memory devices 100a and 100b and a controller 200. The memory system 1000 communicates with a host 300, e.g., through the controller 200. The controller 200 controls operations of the semiconductor memory devices 100a and 100b, based on a command received from the host 300. More specifically, the controller 200 may communicate with the semiconductor memory device 100a through a first channel CH1, and with the semiconductor memory device 100b through a second channel CH2. However, this is merely illustrative, e.g., the controller 200 may communicate with the semiconductor memory devices 100a and 100b through one channel.

Wear leveling of the memory system 1000 is a technique for preventing an excessive use of a specific memory block by equally or evenly recording data across a plurality of memory blocks included in the semiconductor memory devices 100a and 100b. Accordingly, a device error and data loss, which may occur in the semiconductor memory devices 100a and 100b in the memory system 1000, can be prevented or avoided in advance, so that the durability and stability of the semiconductor memory devices 100a and 100b can be improved.

According to the wear leveling technique, the controller 200 may count and maintain a number of erase operations (erase number) in memory blocks included in each of the semiconductor memory devices 100a and 100b, and allow new data to be preferentially recorded in a memory block having a low erase number. In the wear leveling technique, the numbers of write operations (write number) between the memory blocks included in the semiconductor memory devices 100a and 100b are equalized, so that a number of write operations in or read operations on a specific memory block can be reduced, thereby extending the entire lifetime of the memory system 1000.

The wear leveling may be divided into three types, i.e., dynamic wear leveling, static wear leveling, and global wear leveling.

Dynamic wear leveling refers to a technique for allowing a memory block having a small erase number to be preferentially used for a write operation from now on by considering only a space currently available in the memory system 1000.

Static wear leveling refers to a technique for moving, to a block which ages the most rapidly, static data, i.e., data which occupies a memory but hardly has a write or erase operation performed thereon, e.g., moving image data being kept, under the assumption that a block does not age when a read operation is performed on the block. The static wear leveling may use one semiconductor memory device as an area considered when an erase number is calculated. That is, according to the static wear leveling technique, static data is moved from a memory block having a small erase number to another memory block having a large erase number among a plurality of memory blocks in a single semiconductor memory device, so that a block having a relatively small erase number can be preferentially used later.

Global wear leveling refers to a wear leveling technique between a plurality of semiconductor memory devices. Unlike the static wear leveling in which a data migration area is limited to units within single semiconductor memories, in the global wear leveling, a data migration operation is performed between memory blocks included in multiple semiconductor memory devices 100a and 100b included in the memory system 1000.

The present disclosure relates to a technique in which, in the global wear leveling accompanying a data migration operation between the semiconductor memory devices 100a and 100b, when a power supply is suddenly interrupted during the data migration operation, i.e., even when a sudden power-off (SPO) occurs, the data migration operation can be stably resumed after the power supply is resumed.

Figure 2:
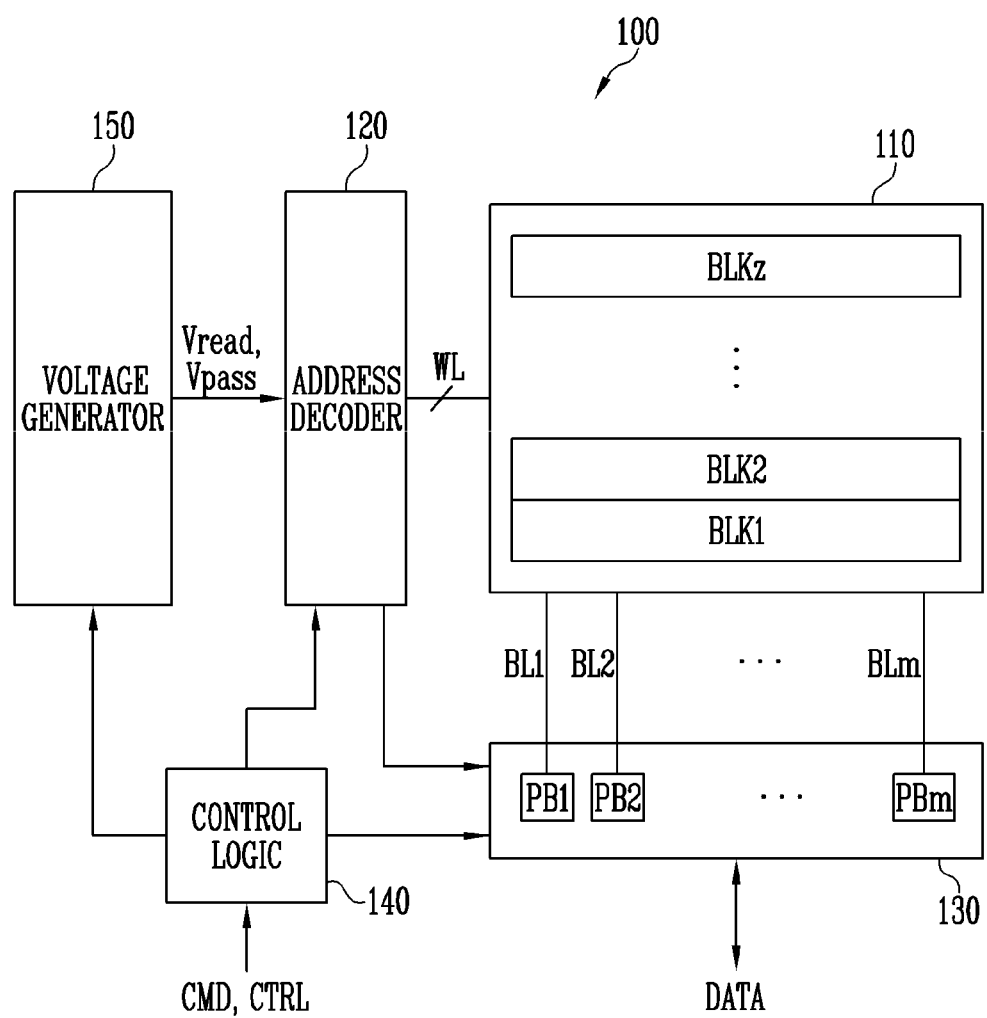
FIG. 2 is a block diagram illustrating a semiconductor memory device shown in FIG. 1.

FIG. 2 is a block diagram illustrating the semiconductor memory device shown in FIG. 1. Each of the semiconductor memory devices 100a and 100b shown in FIG. 1 may be implemented as a semiconductor memory device 100 shown in FIG. 2.

Referring to FIG. 2, the semiconductor memory device 100 may include a memory cell array 110, an address decoder 120, a read/write circuit 130, a control logic 140, and a voltage generator 150.

The memory cell array 110 includes a plurality of memory blocks BLK1 to BLKz. The plurality of memory blocks BLK1 to BLKz are connected to the address decoder 120 through word lines WL. The plurality of memory blocks BLK1 to BLKz are connected to the read/write circuit 130 through bit lines BL1 to BLm. Each of the plurality of memory blocks BLK1 to BLKz includes a plurality of memory cells. In an embodiment, the plurality of memory cells may be nonvolatile memory cells, and be configured as nonvolatile memory cells having a vertical channel structure. The memory cell array 110 may be configured as a memory cell array having a two-dimensional structure. In some embodiments, the memory cell array 110 may be configured as a memory cell array having a three-dimensional structure. Meanwhile, each of the plurality of memory cells included in the memory cell array 110 may store at least 1-bit data. In an embodiment, each of plurality of the memory cells included in the memory cell array 110 may be a single-level cell (SLC) storing 1-bit data. In another embodiment, each of the plurality of memory cells included in the memory cell array 110 may be a multi-level cell (MLC) storing 2-bit data. In still another embodiment, each of the plurality of memory cells included in the memory cell array 110 may be a triple-level cell (TLC) storing 3-bit data. In still another embodiment, each of the plurality of memory cells included in the memory cell array 110 may be a quadruple-level cell (QLC) storing 4-bit data. In some embodiments, the memory cell array 110 may include a plurality of memory cells each storing 5-or-more bit data.

The address decoder 120, the read/write circuit 130, the control logic 140, and the voltage generator 150 operate together as a peripheral circuit for driving the memory cell array 110. The address decoder 120 is connected to the memory cell array 110 through the word lines WL. The address decoder 120 operates under the control of the control logic 140. The address decoder 120 receives an address through an input/output buffer (not shown) in the semiconductor memory device 100.

The address decoder 120 decodes a block address in the received address. The address decoder 120 selects at least one memory block according to the decoded block address. In a read voltage application operation during a read operation, the address decoder 120 applies a read voltage Vread generated by the voltage generator 150 to a selected word line of the selected memory block, and applies a pass voltage Vpass generated by the voltage generator 150 to the other unselected word lines. In a program verify operation, the address decoder 120 applies a verify voltage generated by the voltage generator 150 to the selected word line of the selected memory block, and applies the pass voltage Vpass to the other unselected word lines.

The address decoder 120 decodes a column address in the received addresses. The address decoder 120 transmits the decoded column address to the read/write circuit 130.

Read and program operations of the semiconductor memory device 100 are performed in units of pages. An address received in response to a request for the read and program operations includes a block address, a row address, and a column address. The address decoder 120 selects one memory block and one word line according to the block address and the row address. The column address is decoded by the address decoder 120 to be provided to the read/write circuit 130.

The address decoder 120 may include a block decoder, a row decoder, a column decoder, an address buffer, and the like.

The read/write circuit 130 includes a plurality of page buffers PB1 to PBm. The read/write circuit 130 may operate as a "read circuit" in a read operation, and operate as a "write circuit" in a write operation. The plurality of page buffers PB1 to PBm are connected to the memory cell array 110 through the bit lines BL1 to BLm. In order to sense a threshold voltage of memory cells in a read operation or a program verify operation, the plurality of page buffers PB1 to PBm latch sensing data by sensing, through a sensing node, a change in the amount of current flowing according to a program state of a corresponding memory cell while continuously supplying a sensing current to bit lines connected to the memory cells. The read/write circuit 130 operates in response to page buffer control signals output from the control logic 140.

In a read operation, the read/write circuit 130 temporarily store read data by sensing data of a memory cell and then outputs data DATA to the input/output buffer (not shown) of the semiconductor memory device 100. In an exemplary embodiment, the read/write circuit 130 may include a column select circuit and the like in addition to the page buffers (or page registers).

The control logic 140 is connected to the address decoder 120, the read/write circuit 130, and the voltage generator 150. The control logic 140 receives a command CMD and a control signal CTRL through the input/output buffer (not shown) of the semiconductor memory device 100. The control logic 140 controls a general operation of the semiconductor memory device 100 in response to the control signal CTRL. Also, the control logic 140 outputs a control signal for adjusting a sensing node precharge potential level of the plurality of page buffers PB1 to PBm. The control logic 140 may control the read/write circuit 130 to perform a read operation of the memory cell array 110.

The voltage generator 150 generates a read voltage Vread and a pass voltage Vpass in a read operation in response to a control signal output from the control logic 140. In order to generate a plurality of voltages having various voltage levels, the voltage generator 150 may include a plurality of pumping capacitors for receiving an internal power voltage, and generate the plurality of voltages by selectively activating the plurality of pumping capacitors under the control of the control logic 140. As described above, the voltage generator 150 may include a charge pump, and the charge pump may include the plurality of pumping capacitors. A configuration of the charge pump included in the voltage generator 150 may be variously designed.

The address decoder 120, the read/write circuit 130, and the voltage generator 150 may serve as a "peripheral circuit" for performing a read operation, a write operation, and an erase operation on the memory cell array 110. The peripheral circuit performs the read operation, the write operation, and the erase operation on the memory cell array 110 under the control of the control logic 140.

Figure 3:
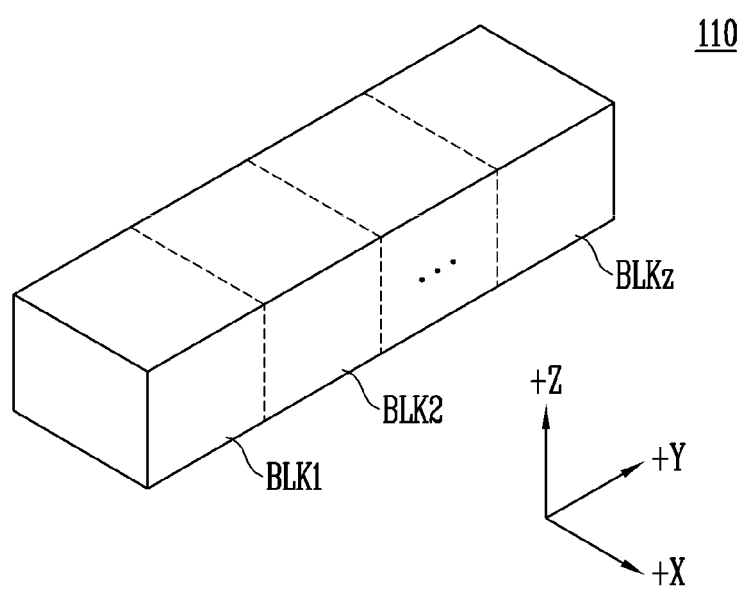
FIG. 3 is a diagram illustrating an exemplary embodiment of the memory cell array shown in FIG. 2.

FIG. 3 is a diagram illustrating the memory cell array 110 shown in FIG. 2.

Referring to FIG. 3, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIGS. 4 and 5.

Figure 4:
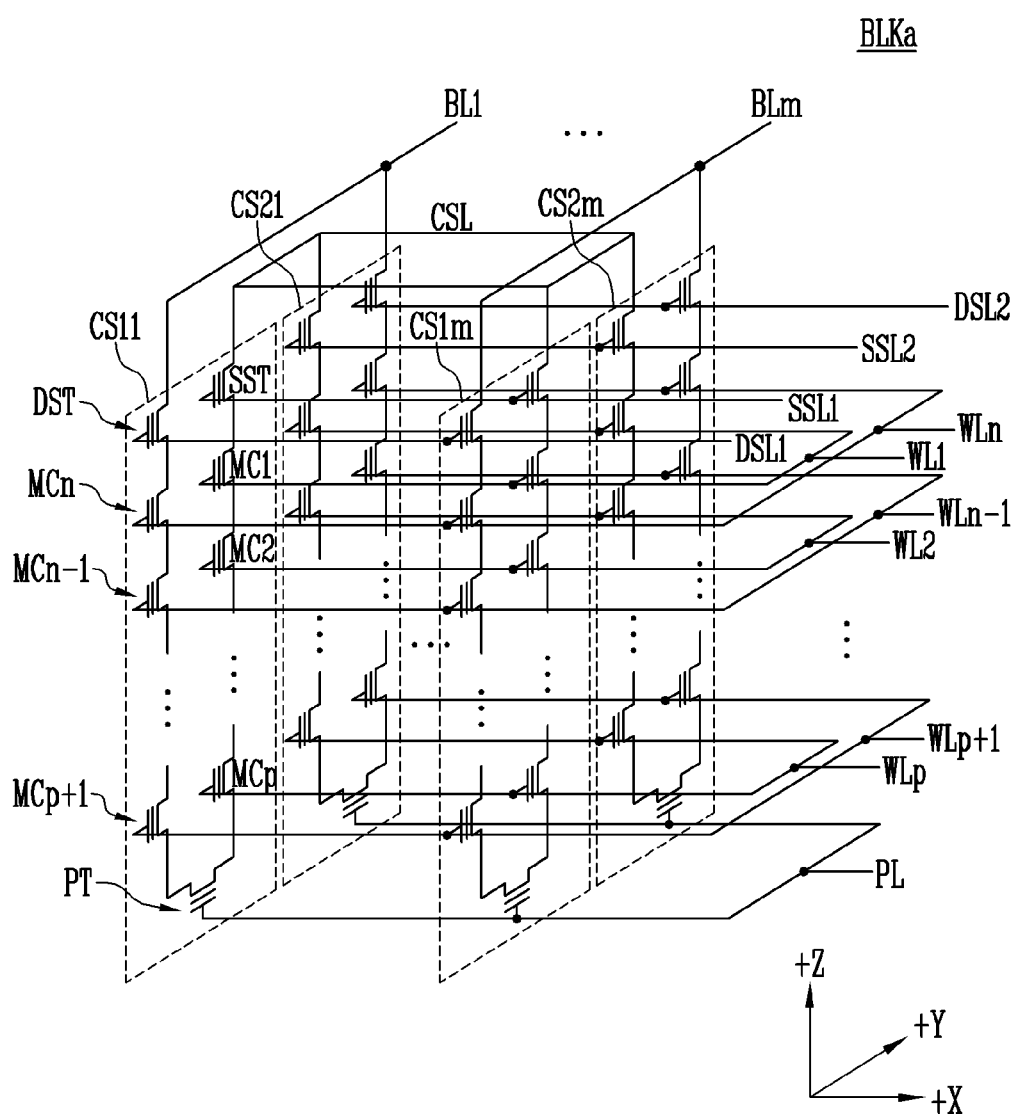
FIG. 4 is a circuit diagram illustrating a memory block among a plurality of memory blocks shown in FIG. 3 according to an embodiment of the present disclosure.

FIG. 4 is a circuit diagram illustrating a memory block BLKa among the memory blocks BLK1 to BLKz shown in FIG. 3.

Referring to FIG. 4, the memory block BLKa may include a plurality of cell strings CS11 to CS1$m$ and CS21 to CS2$m$. In an embodiment, each of the plurality of cell strings CS11 to CS1$m$ and CS21 to CS2$m$ may be formed in a 'U' shape. In the memory block BLKa, m cell strings are arranged in a row direction (i.e., a +X direction). In the example shown in FIG. 4, two cell strings arranged in a column direction (i.e., a +Y direction) are used, this is for convenience of description and should not be limiting, and it is to be understood that three cell strings may be arranged in the column direction.

Each of the plurality of cell strings CS11 to CS1$m$ and CS21 to CS2$m$ may include at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is connected between a common source line CSL and memory cells MC1 to MCp.

In an embodiment, the source select transistors of cell strings arranged on the same row are connected to a source select line extending in the row direction, and the source select transistors of cell strings arranged on different rows are connected to different source select lines. In FIG. 4, the source select transistors of the cell strings CS11 to CS1$m$ on a first row are connected to a first source select line SSL1. The source select transistors of the cell strings CS21 to CS2$m$ on a second row are connected to a second source select line SSL2.

In another embodiment, the source select transistors of the cell strings CS11 to CS1$m$ and CS21 to CS2$m$ may be commonly connected to one source select line.

The first to nth memory cells MC1 to MCn of each cell string are connected between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are connected in series between the source select transistor SST and the pipe transistor PT. The (p+1)th to nth memory cells MCp+1 to MCn are sequentially arranged in the +Z direction, and are connected in series between the pipe transistor PT and the drain select transistor DST. The first to pth memory cells MC1 to MCp and the (p+1)th to nth memory cells MCp+1 to MCn are connected through the pipe transistor PT. Gate electrodes of the first to nth memory cells MC1 to MCn of each cell string are connected to first to nth word lines WL1 to WLn, respectively.

A gate of the pipe transistor PT of each cell string is connected to a pipe line PL.

The drain select transistor DST of each cell string is connected between a corresponding bit line and the memory cells MCp+1 to MCn. The drain select transistors of cell strings arranged in the row direction are connected to a drain select line extending in the row direction. The drain select transistors of the cell strings CS11 to CS1$m$ on the first row are connected to a first drain select line DSL1. The drain select transistors of the cell strings CS21 to CS2$m$ on the second row are connected to a second drain select line DSL2.

Cell strings arranged in the column direction are connected to a bit line extending in the column direction. In FIG. 4, the cell strings CS11 and CS21 on a first column are connected to a first bit line BL1. The cell strings CS1$m$ and CS2$m$ on an mth column are connected to an mth bit line BL$m$.

Memory cells connected to the same word line in the cell strings arranged in the row direction constitute one page. For example, memory cells connected to the first word line WL1 in the cell strings CS11 to CS1$m$ on the first row constitute one page. Memory cells connected to the first word line WL1 in the cell strings CS21 to CS2$m$ on the second row constitute another page. As any one of the drain select lines DSL1 and DSL2 is selected, cell strings arranged in one row direction may be selected. As any one of the word lines WL1 to WLn is selected, one page may be selected in the selected cell strings.

In another embodiment, even bit lines and odd bit lines may be provided instead of the first to mth bit lines BL1 to BL$m$. In addition, even-numbered cell strings among the cell strings CS11 to CS1$m$ or CS21 to CS2$m$ arranged in the row direction may be connected to the even bit lines, respectively, and odd-numbered cell strings among the cell strings CS11 to CS1$m$ or CS21 to CS2$m$ arranged in the row direction may be connected to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKa is improved, but the size of the memory block BLKa also increases. Conversely, when the number of dummy memory cells decreases, the size of the memory block BLKa decreases, however, the reliability of an operation of the memory block BLKa may be deteriorated.

In order to efficiently control the at least one dummy memory cell, the dummy memory cells may have a required threshold voltage. Before or after an erase operation of a memory block BLKa, a program operation may be performed on all or some of the dummy memory cells. When an erase operation is performed after a program operation is performed, the threshold voltage of the dummy memory cells control a voltage applied to the dummy word lines connected to the respective dummy memory cells, so that the dummy memory cells can have the required threshold voltage.

Figure 5:
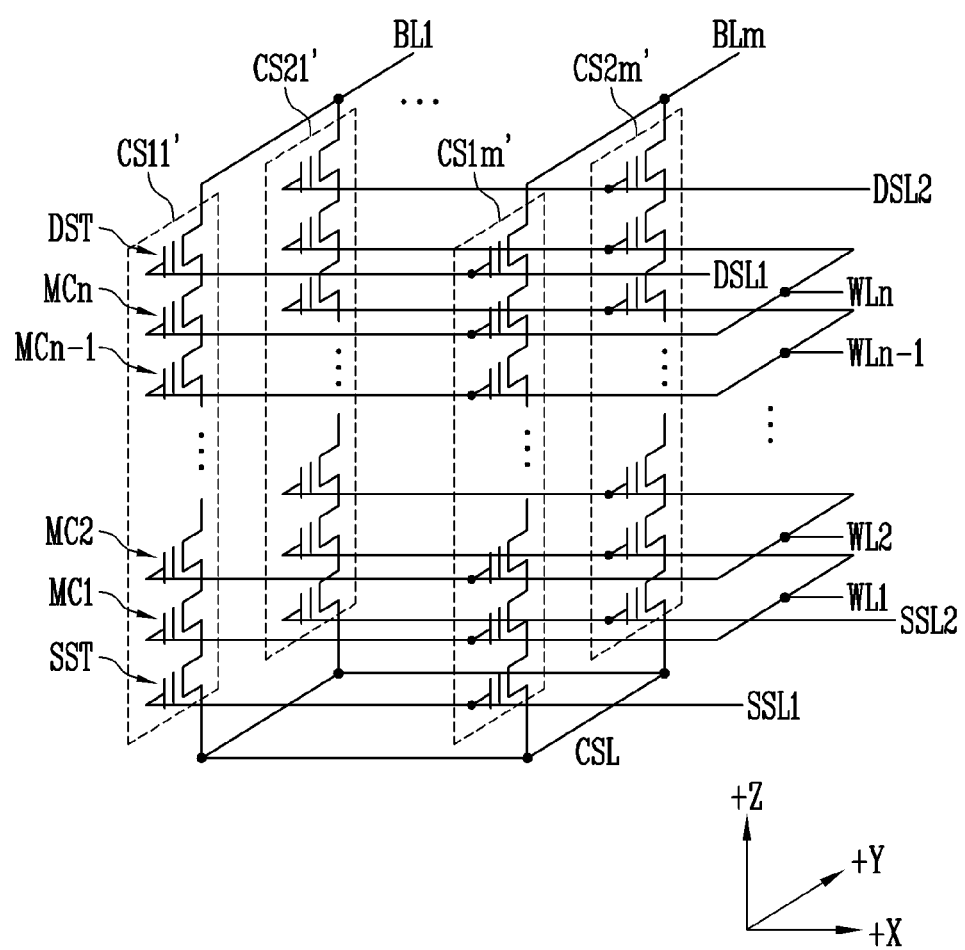
FIG. 5 is a circuit diagram illustrating a memory block among the memory blocks shown in FIG. 3 according to another embodiment of the present disclosure.

FIG. 5 is a circuit diagram illustrating a memory block BLKb among the memory blocks BLK1 to BLKz shown in FIG. 3 according to another embodiment of the present disclosure.

Referring to FIG. 5, the memory block BLKb may include a plurality of cell strings CS11' to CS1$m$' and CS21' to CS2$m$'. Each of the plurality of cell strings CS11' to CS1$m$' and CS21' to CS2$m$' extends along the +Z direction. Each of the plurality of cell strings CS11' to CS1$m$' and CS21' to CS2$m$' includes at least one source select transistor SST, first to nth memory cells MC1 to MCn, and at least one drain select transistor DST, which are stacked on a substrate (not shown) under the memory block BLKb.

The source select transistor SST of each cell string is connected between a common source line CSL and the memory cells MC1 to MCn. The source select transistors of cell strings arranged on the same row are connected to the same source select line. The source select transistors of the cell strings CS11' to CS1$m$' arranged on a first row are connected to a first source select line SSL1. Source select transistors of the cell strings CS21' to CS2$m$' arranged on a second row are connected to a second source select line SSL2. In another embodiment, the source select transistors of the cell strings CS11' to CS1$m$' and CS21' to CS2$m$' may be commonly connected to one source select line.

The first to nth memory cells MC1 to MCn of each cell string are connected in series between the source select transistor SST and the drain select transistor DST. Gate electrodes of the first to nth memory cells MC1 to MCn are connected to first to nth word lines WL1 to WLn, respectively.

The drain select transistor DST of each cell string is connected between a corresponding bit line and the memory cells MC1 to MCn. The drain select transistors of cell strings arranged in the row direction are connected to a drain select line extending in the row direction. The drain select transistors of the cell strings CS11' to CS1$m$' on the first row are connected to a first drain select line DSL1. The drain select transistors of the cell strings CS21' to CS2$m$' on the second row are connected to a second drain select line DSL2.

Consequently, the memory block BLKb of FIG. 5 has a circuit similar to that of the memory block BLKa of FIG. 4, except that the pipe transistor PT is excluded from each cell string in FIG. 5.

In another embodiment, even bit lines and odd bit lines may be provided instead of the first to mth bit lines BL1 to BL$m$. In addition, even-numbered cell strings among the cell strings CS11' to CS1$m$' or CS21' to CS2$m$' arranged in the row direction may be connected to the even bit lines, respectively, and odd-numbered cell strings among the cell strings CS11' to CS1$m$' or CS21' to CS2$m$' arranged in the row direction may be connected to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCn. Alternatively, the at least one dummy memory cell may be provided to decrease an electric field between the drain select transistor DST and the memory cells MC1 to MCn. When the number of dummy memory cells increases, the reliability of an operation of the memory block BLKb is improved, but the size of the memory block BLKb also increases. Conversely, when the number of dummy memory cells decreases, the size of the memory block BLKb decreases, however, the reliability of an operation of the memory block BLKb may be deteriorated.

In order to efficiently control the at least one dummy memory cell, the dummy memory cells may have a required threshold voltage. Before or after an erase operation of a memory block BLKb, a program operation may be performed on all or some of the dummy memory cells. When an erase operation is performed after the program operation is performed, the threshold voltage of the dummy memory cells controls a voltage applied to the dummy word lines connected to the respective dummy memory cells, so that the dummy memory cells can have the required threshold voltage.

Figure 6:
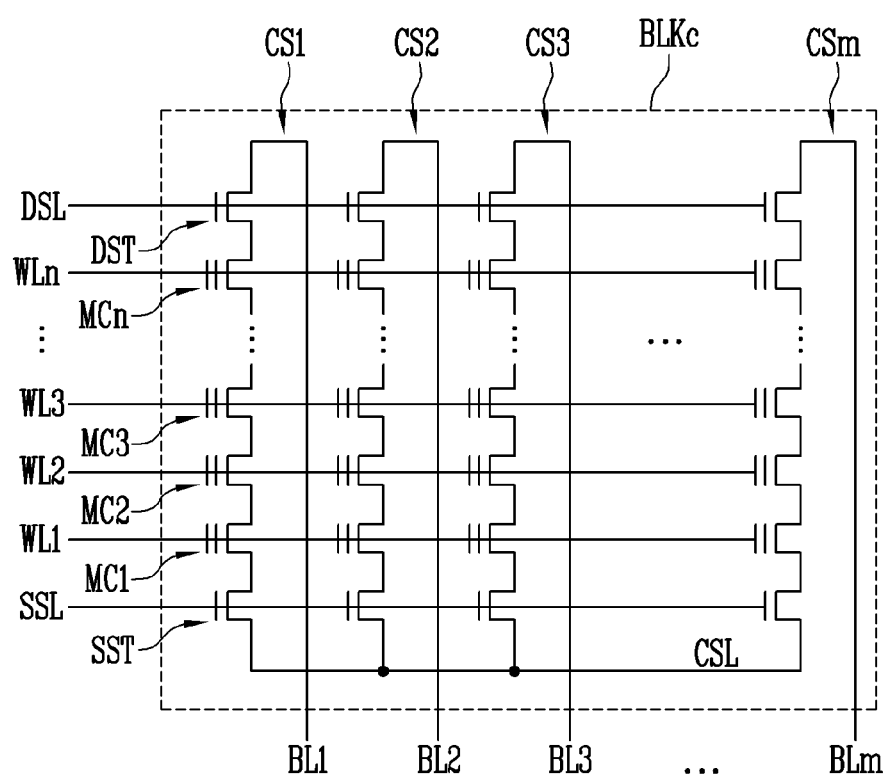
FIG. 6 is a circuit diagram illustrating a memory block among a plurality of memory blocks included in the memory cell array shown in FIG. 2 according to an embodiment of the present disclosure.

FIG. 6 is a circuit diagram illustrating a memory block BLKc among the plurality of memory blocks BLK1 to BLKz included in the memory cell array 110 shown in FIG. 2.

Referring to FIG. 6, the memory block BLKc includes a plurality of cell strings CS1 to CSm. The plurality of cell strings CS1 to CSm may be connected to a plurality of bit lines BL1 to BLm, respectively. Each of the plurality of strings CS1 to CSm includes at least one source select transistor SST, first to nth memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is connected between a common source line CSL and the memory cells MC1 to MCn.

The first to nth memory cells MC1 to MCn of each cell string is connected between the source select transistor SST and the drain select transistor DST.

The drain select transistor DST of each cell string is connected between a corresponding bit line and the memory cells MC1 to MCn.

Memory cells connected to the same word line constitute one page. As a drain select line DSL is selected, the cell strings CS1 to CSm may be selected. As any one of word lines WL1 to WLn is selected, one page among selected cell strings may be selected.

In another embodiment, even bit lines and odd bit lines may be provided instead of the first to mth bit lines BL1 to BLm. Even-numbered cell strings among the cell strings CS1 to CSm arranged may be connected to the even bit lines, respectively, and odd-numbered cell strings among the cell strings CS1 to CSm may be connected to the odd bit lines, respectively.

Figure 7:
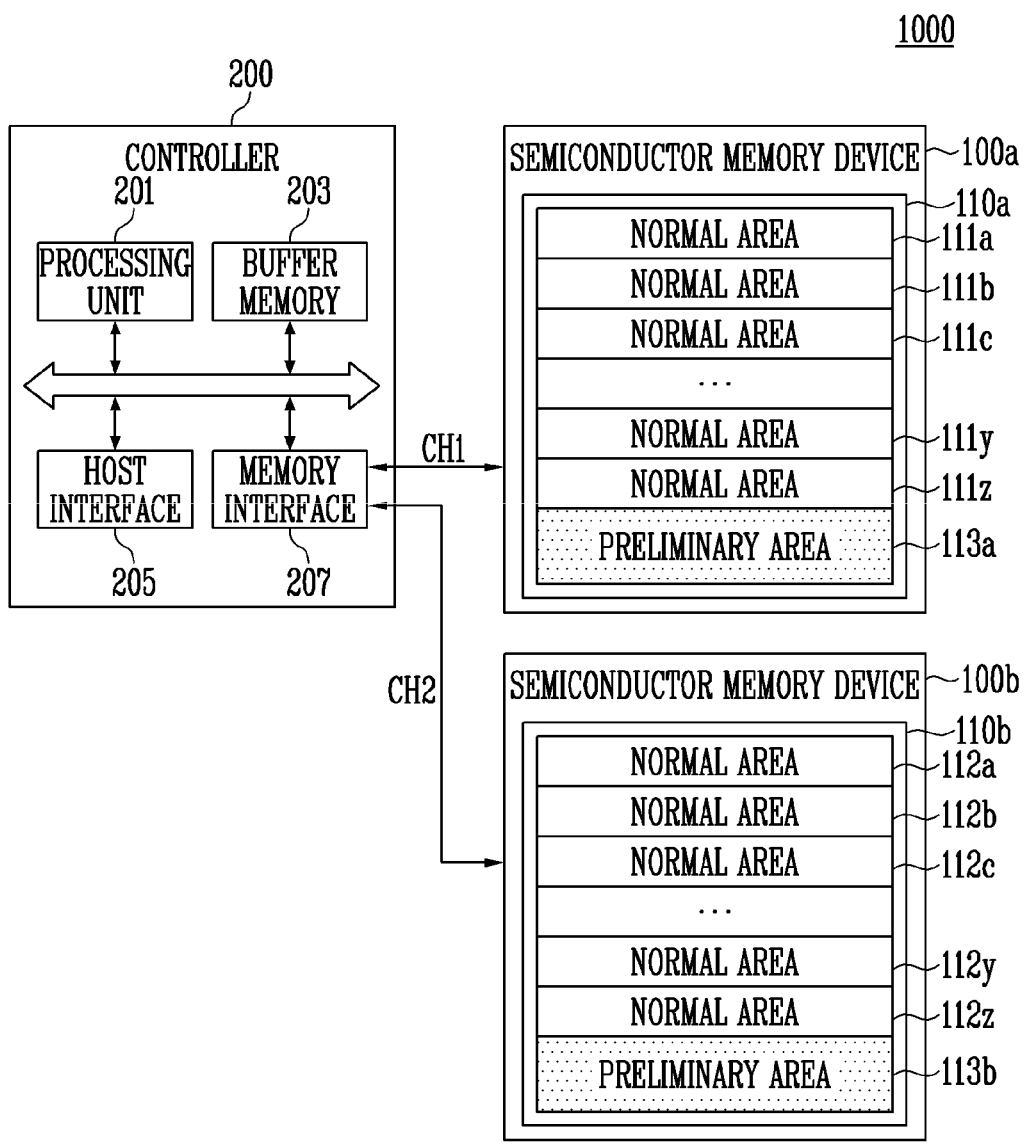
FIG. 7 is a block diagram illustrating a memory system according to an embodiment of the present disclosure.

FIG. 7 is a block diagram illustrating a memory system 1000 which can be the system shown in FIG. 1 according to an embodiment of the present disclosure.

Referring to FIG. 7, the memory system 1000 includes semiconductor memory devices 100a and 100b and a controller 200. Each of the semiconductor memory devices 100a and 100b may be the semiconductor memory device described with reference to FIG. 2. The controller 200 corresponds to the controller 200 shown in FIG. 1. Hereinafter, overlapping descriptions will be omitted for the sake of brevity.

The semiconductor memory devices 100a and 100b may respectively include memory cell arrays 110a and 110b. The semiconductor memory device 100a may communicate with the controller 200 through a first channel CH1. Meanwhile, the semiconductor memory device 100b may communicate with the controller 200 through a second channel CH2. The memory cell array 110a of the semiconductor memory device 100a may include a plurality of normal areas 111a to 111z and a preliminary area 113a. In addition, the memory cell array 110b of the semiconductor memory device 100b may include a plurality of normal areas 112a to 112z and a preliminary area 113b. In FIG. 7, the illustration of components except the memory cell arrays 110a and 110b of the semiconductor memory devices 100a and 100b is omitted for the sake of clarity.

User data received from the host may be stored in the normal areas 111a to 111z of the first semiconductor memory device 100a and the normal areas 112a to 112z of the second semiconductor memory device 100b. Meanwhile, data for a data migration operation may be stored in the preliminary area 113a of the first semiconductor memory device 100a and the preliminary area 113b of the second semiconductor memory device 100b.

The controller 200 may include a processing unit 201, a buffer memory 203, a host interface 205, and a memory interface 207. The processing unit 201 may include a micro control unit (MCU) or a central processing unit (CPU). The processing unit 201 may process a request transmitted from the host. In order to process the received request, the processing unit 201 may drive an instruction or algorithm of code, i.e., firmware, and control internal function blocks and the semiconductor memory device 100.

The host interface 205 may interface the host and the memory system 1000. The buffer memory 203 may include a random access memory, such as a dynamic random access memory (DRAM) or a static random access memory (SRAM). The buffer memory 203 may temporarily store program data received from the host or read data received from the semiconductor memory devices 100a and 100b.

Meanwhile, in the data migration operation, the controller 200 may read target data which becomes a migration target from a semiconductor memory device including a target area, which is selected from the semiconductor memory devices 100a and 100b, and store the target data to the buffer memory 203. The controller 200 may generate migration data including a plurality of group migration complete data, based on the target data stored in the buffer memory 203. The generated migration data may be stored in the buffer memory 203. The controller 200 may control any one of the semiconductor memory devices 100a and 100b to program the generated migration data to a destination area.

In an embodiment of the present disclosure, the plurality of group migration complete data may be data representing partial completion of a migration operation on the target data. The generation of the plurality of group migration complete data will be described with reference to FIGS. 9 and 10. A method for resuming the data migration operation based on the plurality of group migration complete data will be described with reference to FIGS. 14 to 17B.

The memory interface 207 may control the semiconductor memory devices 100a and 100b under the control of the processing unit 201. The memory interface 207 may generate a command for controlling the semiconductor memory devices 100a and 100b, an address, a control signal, and the like, and transfer the command, the address, the control signal, and the like to the semiconductor memory devices 100a and 100b through the channels CH1 and CH2. Also, the memory interface 207 may receive data provided from the semiconductor memory devices 100a and 100b through the channels CH1 and CH2.

The plurality of normal areas 111a to 111z and 112a to 112z and the preliminary areas 113a and 113b, which are shown in FIG. 7, may correspond to a data storage area having an arbitrary size. In an embodiment, each of the plurality of normal areas 111a to 111z and 112a to 112z and the preliminary areas 113a and 113b may correspond to a memory block. That is, the normal areas 111a to 111z and 112a to 112z may be memory blocks in which user data received from the host is stored. The preliminary areas 113a and 113b may be memory blocks in which the migration data generated from the target data is stored.

In the example shown in FIG. 7, each of the semiconductor memory devices 100a and 100b includes one preliminary area, but it is to be understood that the present disclosure is not limited thereto, e.g., each of the semiconductor memory devices 100a and 100b may include two or more preliminary areas. The preliminary area included in each of the semiconductor memory devices 100a and 100b is an area for storing data migrated in the data migration operation. The memory system in accordance with the embodiment of the present disclosure may store data in the normal areas 111a to 111z and 112a to 112z of the semiconductor memory devices 100a and 100b in a write operation performed in response to a write request from the host 300. Also, the memory system according to the embodiment of the present disclosure may store migrated data in the preliminary areas 113a and 113b distinguished from the normal areas 111a to 111z and 112a to 112z in the data migration operation internally performed therein.

In addition, although FIG. 7 shows that the memory system 1000 includes two semiconductor memory devices 100a and 110b, the present disclosure is not limited thereto, e.g., the memory system 1000 may include three or more semiconductor memory devices.

In the memory system 1000, target data which becomes a target of a migration operation is read from the first semiconductor memory device 100a in the data migration operation between the semiconductor memory devices 100a and 100b. Subsequently, the memory system 1000 generates migration data including a plurality of group migration complete data, based on the read target data, and programs the generated migration data to the preliminary area 113b of the second semiconductor memory device 100b. Accordingly, when a power supply to the memory system is suddenly interrupted during the data migration operation, i.e., when a sudden power-off (SPO) occurs, a spot at which the data migration operation is resumed can be determined based on the group migration complete data, when the power supply is resumed. Thus, occurrence of SPO during the data migration operation can be effectively handled even in the case of a memory system which is not provided with a capacitor for supplying emergency power when the power supply is interrupted. Accordingly, the operational stability of the memory system can be improved.

Figure 8:
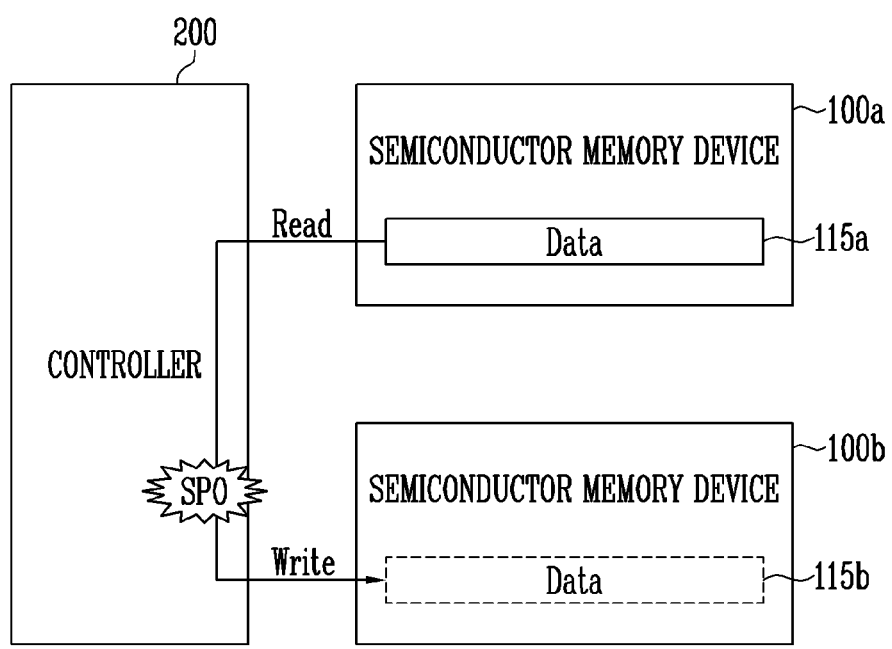
FIG. 8 is a diagram illustrating data migration between a plurality of semiconductor memory devices.

FIG. 8 is a diagram illustrating data migration between the semiconductor memory devices 100a and 100b.

Referring to FIG. 8, a data migration operation in global wear leveling is systematically illustrated. As shown in FIG. 8, there may occur a case where data 115a stored in the semiconductor memory device 100a is to be migrated to the semiconductor memory device 100b in a global wear leveling operation. The data 115a stored in the semiconductor memory device 100a is target data, and may be determined as a target of the data migration operation. The target data may be stored in the normal areas 111a to 111z of the semiconductor memory device 100a, but it may also be stored in the preliminary area 113a of the semiconductor memory device 100a, as shown in FIG. 7.

In order to migrate the data 115a as the target data, the controller 200 may control the semiconductor memory device 100a to read the data 115a. The read data 115a may be transferred to the controller 200. The controller 200 may write data 115b to the semiconductor memory device 100b, based on the read data 115a. The data 115b may be the same data as the data 115a read from the first semiconductor memory device 100a. When an SPO occurs in the memory system 1000 during the data migration operation, there may occur a case where the data migration operation is not recovered even when a power supply is resumed.

When the memory system includes a capacitor capable of supplying emergency power, a data migration situation in occurrence of an SPO may be stored in any one of the semiconductor memory devices 100a and 100b. However, when the memory system is not provided with such a capacitor or when the provided capacitor does not have sufficient capacity to record or complete the data migration operation, the data migration operation is restarted from the beginning when the power supply is resumed after the SPO occurs.

In the memory system and the operating method thereof according to exemplary embodiments of the present disclosure, target data which becomes a target of a migration operation is read from the semiconductor memory device 100a in the data migration operation between the semiconductor memory devices 100a and 100b. Subsequently, the memory system generates migration data including a plurality of group migration complete data, based on the read target data, and programs the generated migration data to the preliminary area 113b of the semiconductor memory device 100b. Accordingly, when power of the memory system is suddenly interrupted during the data migration operation, i.e., when a sudden power-off (SPO) occurs, a spot at which the data migration operation is resumed may be determined based on the group migration complete data, when the power supply is resumed later. Accordingly, the SPO occurring during the data migration operation can be effectively handled even in the case of a memory system which is not provided with a capacitor for supplying emergency power when the power supply is interrupted. Accordingly, the operational stability of the memory system can be improved.

Figure 9:
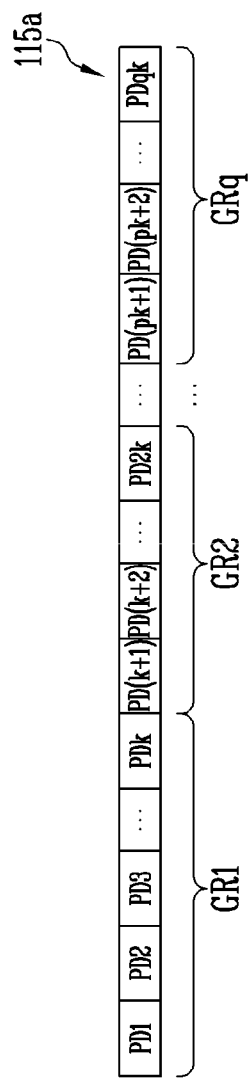
FIG. 9 is a diagram illustrating a structure of data processed by a memory system according to an embodiment of the present disclosure.

FIG. 9 is a diagram illustrating a structure of data processed by the memory system according to an embodiment of the present disclosure.

Referring to FIG. 9, data 115a, i.e., target data which becomes a target of a data migration operation may include a plurality of partial data PD1 to PDqk. The plurality of partial data PD1 to PDqk included in the target data may be grouped into first to qth groups. That is, first to kth partial data PD1 to PDk may belong to a first group GR1, and (k+1)th to 2kth partial data PD(k+1) to PD2k may belong to a second group GR2. In this manner, (pk+1)th to qkth partial data PD(pk+1) to PDqk may belong to a qth group GRq. Although each of the groups GR1 to GRq includes k partial data is illustrated in FIG. 9, the present disclosure is not limited thereto. That is, at least two groups among the plurality of groups GR1 to GRq may include different numbers of partial data.

A size of each of the partial data PD1 to PDqk shown in FIG. 9 may be variously determined. In an embodiment, the size of each of the partial data PD1 to PDqk may be equal to that of a page which becomes a target of a write and read operation. In another embodiment, the size of each of the partial data PD1 to PDqk may be equal to that of a plurality of data chunks included in one page. In addition, the partial data according to the embodiment of the present disclosure may have an arbitrary size.

In an embodiment of the present disclosure, a size of each of the groups GR1 to GRq including the plurality of partial data PD1 to PDqk may be variously determined. In an embodiment, a size of any one group among the groups GR1 to GRq may be equal to that of a page which becomes a target of the write and read operation. In another embodiment, the size of any one group among the groups GR1 to GRq may be equal to that of a stripe which becomes a target of the write and read operation with respect to a super block. In still another embodiment, the size of any one group among the groups GR1 to GRq may be equal to that of a memory block which becomes a target of an erase operation of data. In still another embodiment, the size of any one group among the groups GR1 to GRq may be equal to that of a super block. In addition, each of the groups according to the embodiment of the present disclosure may have an arbitrary size.

Figure 10:
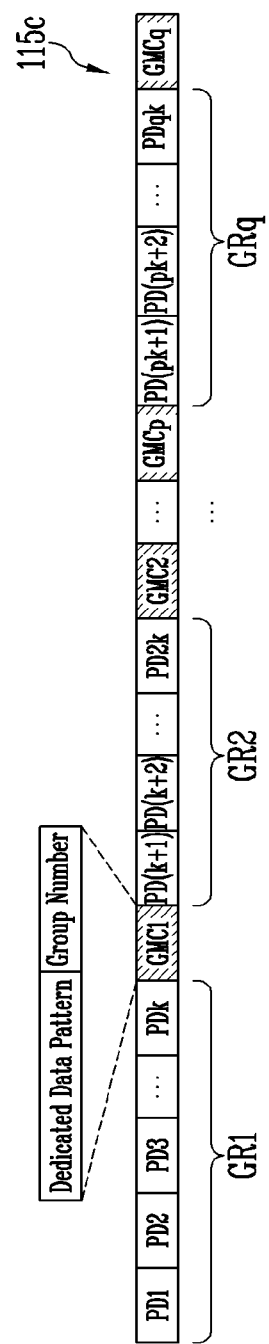
FIG. 10 is a diagram illustrating a structure of migration data generated by a memory system according to an embodiment of the present disclosure.

FIG. 10 is a diagram illustrating a structure of migration data generated by a memory system according to an embodiment of the present disclosure.

Referring to FIG. 10, the memory system in accordance with the embodiment of the present disclosure generates migration data, based on target data which becomes a target of the data migration operation. The migration data may be data to be written in a destination area in the data migration operation.

In one embodiment, the processing unit 201 of the controller 200 divides the data 115a read from the first semiconductor memory device 100a into a plurality of groups as shown in FIG. 9. Subsequently, the processing unit 201 of the controller 200 generates migration data 115c by inserting group migration complete data GMC1 to GMCq into the read data 115a, i.e., the target data.

Each of the group migration complete data GMC1 to GMCq may be data indicating that a migration operation of data included in a group corresponding thereto has been completed. For example, when first group migration complete data GMC1 is normally programmed in the destination area, this may mean that a program on the plurality of partial data PD1 to PDk included in the first group GR1 has been normally completed. Similarly, when second group migration complete data GMC2 is normally programmed in the destination area, this may mean that a program on the plurality of partial data PD(k+1) to PD2k included in the second group GR2 has been normally completed.

To this end, a time at which the program of the first group migration complete data GMC1 is completed is to be posterior to that at which the program of the partial data PD1 to PDk included in the first group GR1 is completed. Therefore, the first group migration complete data GMC1 may be inserted into a rear portion of the partial data PD1 to PDk included in the first group GR1.

In an embodiment of the present disclosure, each of the group migration complete data GMC1 to GMCq included in the migration data 115c may include a dedicated data pattern and a group number. The dedicated data pattern may be a data pattern indicating that partial data including the same data pattern is group migration complete data. That is, when a dedicated data pattern is read in a read of the migration data 115c, it can be determined that partial data including the dedicated data pattern is group migration completion data. To this end, dedicated data patterns included in the respective group migration complete data GMC1 to GMCq may be equal to one another. Meanwhile, the group number may be a number representing a group corresponding to a corresponding group migration complete data. Through a group number, it can be determined which partial data including the group number is group migration complete data among the plurality of group migration complete data GMC1 to GMCq.

Figure 11:
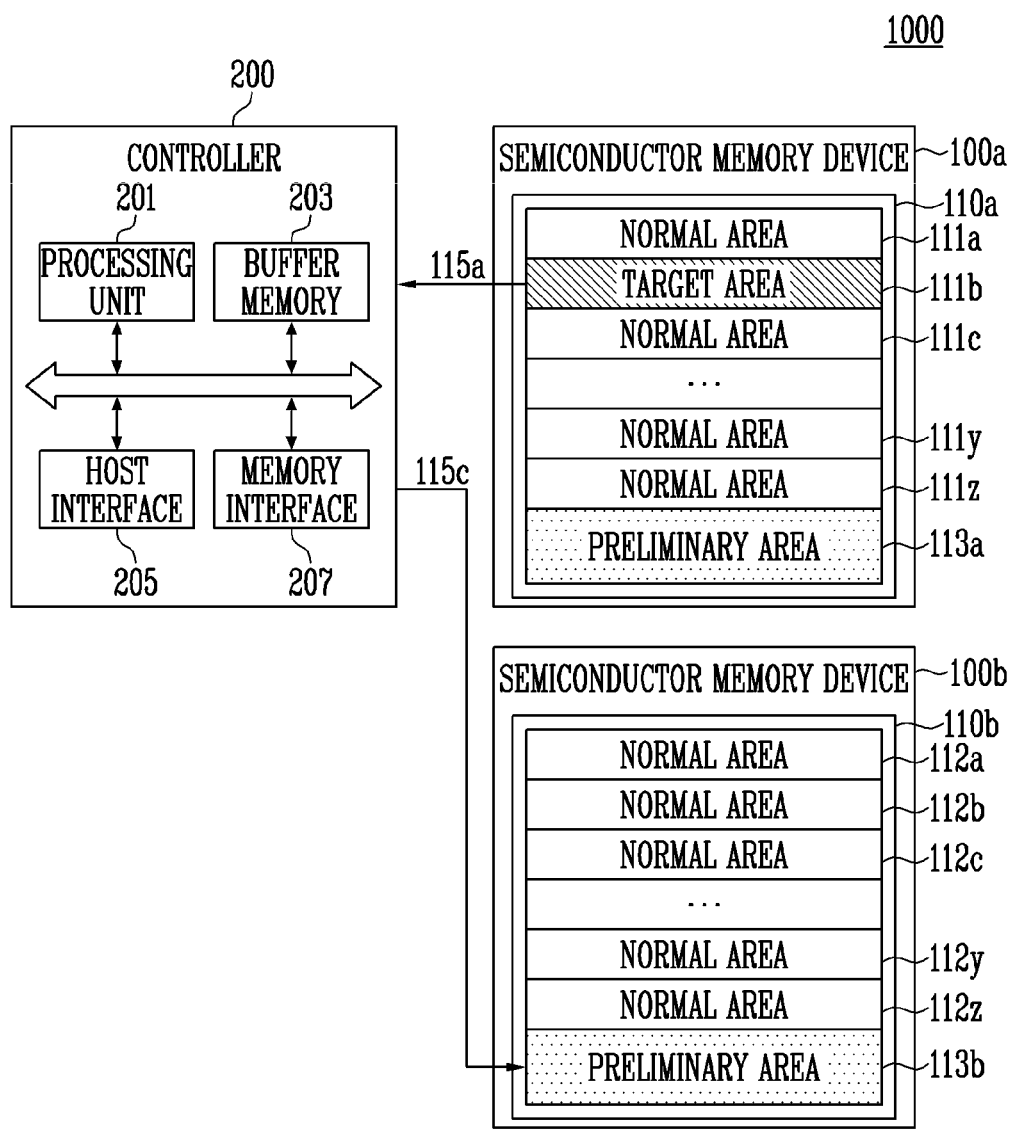
FIG. 11 is a block diagram illustrating data migration according to an embodiment of the present disclosure.

FIG. 11 is a block diagram illustrating data migration according to an embodiment of the present disclosure.

Referring to FIG. 11, a memory system 1000 identical to that shown in FIG. 7 is illustrated. Therefore, the description of the memory system 1000 shown in FIG. 11 will not be repeated herein for the sake of brevity.

The controller 200 of the memory system 1000 may determine data to be migrated for the purpose of global wear leveling. In the example shown in FIG. 11, target data which becomes a target of migration is stored in a target area 111b among normal areas 111a to 111z of the semiconductor memory device 100a. The memory interface 207 may control the semiconductor memory device 100a to read target data 115a stored in the target area 111b. The target data 115a read from the semiconductor memory device 100a may be stored in the buffer memory 203.

The controller 200 may generate migration data including a plurality of group migration complete data, based on the target data stored in the buffer memory 203. As described above with reference to FIG. 10, migration data 115c may be generated by inserting group migration complete data GMC1 to GMCq corresponding to each of the plurality of groups GR1 to GRq into the target data 115a. The generated migration data 115c may be stored in the buffer memory 203. The memory interface 207 of the controller 200 may control the semiconductor memory device 100b to program the generated migration data 115c in a preliminary area 113b of the second semiconductor memory device 100b.

Referring to FIG. 11, the generated migration data 115c is programmed in the preliminary area 113b instead of normal areas 112a to 112z of the semiconductor memory device 100b. This is because, when the migration data 115c is programmed in the normal areas 112a to 112z, it is highly likely that the migration data 115c will be mixed with data stored in response to a request from the host 300. Accordingly, the migration data 115c can be programmed in the preliminary area 113b independently while being separated from the normal areas 112a to 112z. In a recovery operation of the memory system 1000 after an SPO, the controller 200 scans the preliminary area 113b, so that a data migration operation before the SPO can be resumed.

Figure 12:
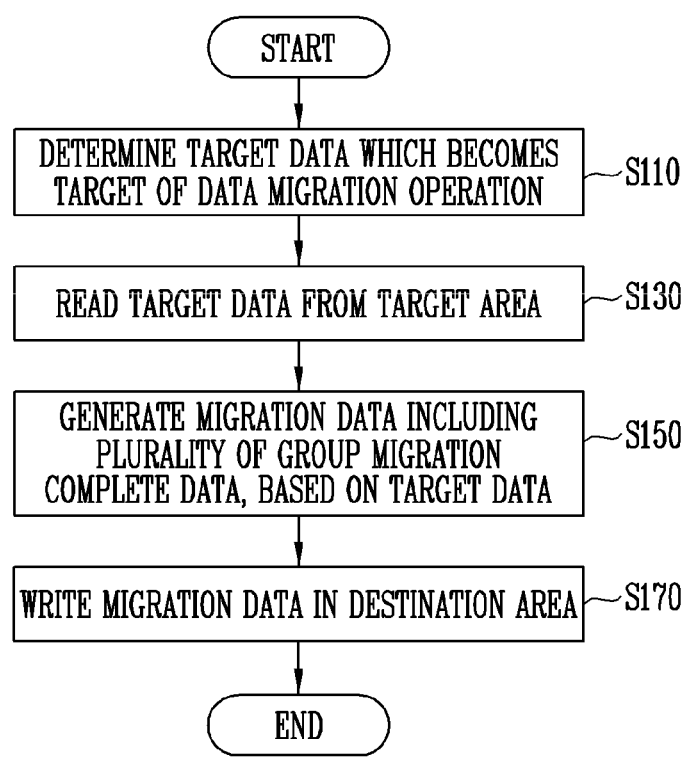
FIG. 12 is a flowchart illustrating a method of operating a memory system according to an embodiment of the present disclosure.

FIG. 12 is a flowchart illustrating a method of operating a memory system according to an embodiment of the present disclosure. In FIG. 12, steps of a data migration operation for the purpose of global wear leveling are described.

Referring to FIG. 12, the memory system 1000 determines target data which becomes a target of a data migration operation (S110), and reads the target data from a target area (S130). Subsequently, the memory system 1000 generates migration data including a plurality of group migration complete data, based on the target data (S150), and writes the generated migration data in a destination area (S170).

In step S110, target data 115a for data migration may be determined as a part of global wear leveling. As shown in FIG. 11, the data 115a of the semiconductor memory device 100a may be determined as the target data.

Subsequently, the controller 200 may control the semiconductor memory device 100a to read the determined target data from the target area (S130). More specifically, the controller 200 may generate a read command for reading data stored in the target area Mb and a read address, and transfer the read command and the read address to the semiconductor memory device 100a. The semiconductor memory device 100a may perform a read operation on the target data 115a, based on the received read command and the received read address, and transfer the read data 115a to the controller 200.

The controller 200 may generate migration data 115c including a plurality of group migration complete data, based on the received target data 115a (S150). As described above, the group migration complete data included in the migration data may be data indicating that a migration operation of partial data included in a corresponding group has been completed. The migration data 115c may be generated as described with reference to FIGS. 9 and 10. The generation of the migration data 115c will be described later with reference to FIG. 13.

Subsequently, the controller 200 may control the semiconductor memory device 100b to store the generated migration data 115c in the preliminary area 113b of the semiconductor memory device 100b. More specifically, the controller 200 may transfer the generated migration data 115c as write data to the semiconductor memory device 100b, and transfer, to the semiconductor memory device 100b, a write address representing an area of an erase state in the preliminary area 113b. Also, the controller 200 may transfer a write command to the semiconductor memory device 100b. The semiconductor memory device 100b may program the migration data 115c in the preliminary area 113b in response to the received write command.

In step S170, a mapping table of partial data of a group of which program has been completed may be updated while the migration data is being written in the destination area. For example, when a program of the first group migration complete data GMC1 is completed, a mapping table of the partial data PD1 to PDk belonging to the first group may be updated. When the mapping table of the partial data PD1 to PDk belonging to the first group is updated, a physical address indicating the corresponding partial data PD1 to PDk may be changed from the target area 111b of the first semiconductor memory device 100a to a destination area, i.e., the preliminary area 113b of the second semiconductor memory device 100b. When a program of the second group migration complete data GMC2 is completed, a mapping table of the partial data PD(k+1) to PD2k belonging to the second group may also be updated.

Figure 13:
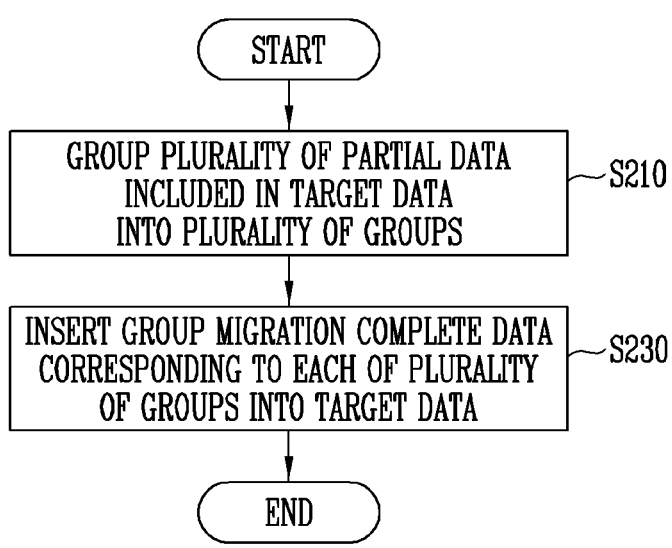
FIG. 13 is a flowchart illustrating an exemplary embodiment of step S150 shown in FIG. 12.

FIG. 13 is a flowchart illustrating an exemplary embodiment of step S150 shown in FIG. 12.

Referring to FIG. 13, step S150 of generating the migration data including the plurality of group migration complete data based on the target data includes step S210 of grouping a plurality of partial data included in the target data into a plurality of groups and step S230 of inserting one of the plurality of group migration complete data corresponding to one of the plurality of groups into the target data.

In step S210, the plurality of partial data PD1 to PDq of the target data 115a may be grouped into the first to qth groups GR1 to GRq as shown in FIG. 9.

In step S230, each of the plurality of group migration complete data corresponding to each one of the plurality of groups may be inserted into the target data. Accordingly, the migration data 115c shown in FIG. 10 is generated. That is, group migration complete data is generated to include a group number corresponding to a specific data pattern, and migration data is generated such that the group migration complete data is located posterior to a corresponding group.

Figure 14:
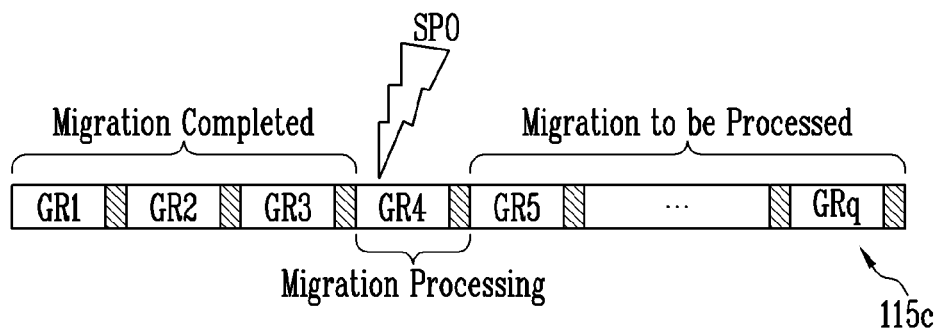
FIG. 14 is a diagram illustrating a situation in which a sudden power-off (SPO) occurs in a memory system while data is being migrated according to an embodiment of the present disclosure.

FIG. 14 is a diagram illustrating a situation in which a sudden power-off (SPO) occurs in a memory system while data is being migrated according to an embodiment of the present disclosure.

Referring to FIG. 14, a plurality of groups GR1 to GRq (indicated as bright blocks) included in migration data 115c and group migration complete data (indicated as dark blocks following the bright blocks) respectively corresponding thereto are illustrated. Group migration complete data corresponding to each of the plurality of groups GR1 to GRq are indicated by a slashed area (dark block).

In FIG. 14, it can be seen that the data migration operation on partial data included in first to third groups GR1 to GR3 has been completed. Subsequently, an SPO has occurred while a migration operation on partial data included in a fourth group GR4 is being processed. A migration operation on fifth to qth groups GR5 to GRq is to be performed later.

Figure 15:
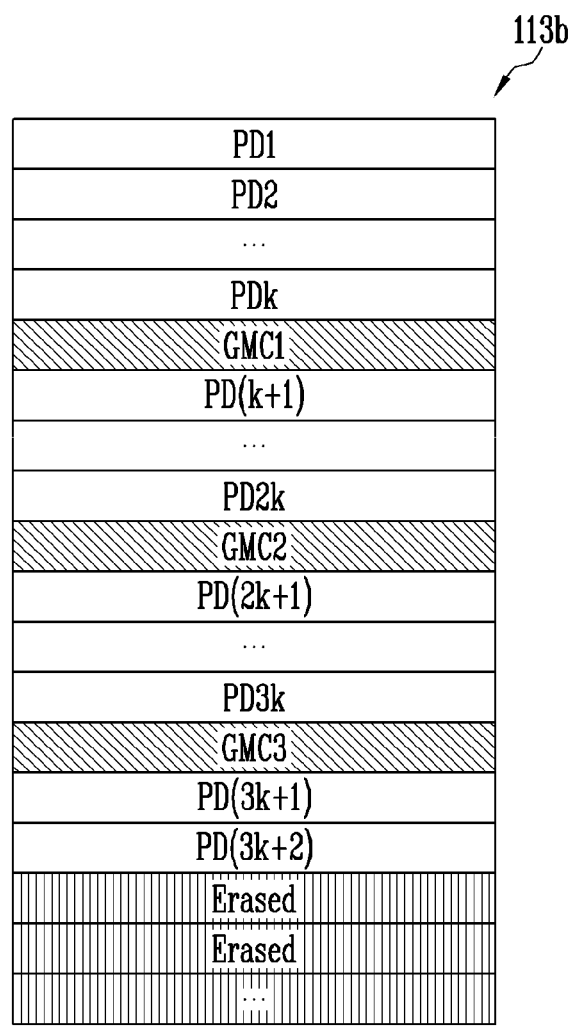
FIG. 15 is a diagram illustrating data programmed in a destination area in the situation described with reference to FIG. 14.

FIG. 15 is a diagram illustrating data programmed in a destination area in the situation described with reference to FIG. 14. In FIG. 15, an example is illustrated, in which a size of partial data is equal to that of a page, and a size of a preliminary area 113b is equal to that of a memory block. However, the present disclosure is not limited thereto, it will be appreciated that the size of the partial data and the size of the preliminary area may be variously selected according to design requirements.

Referring to FIGS. 14 and 15 together, the data migration operation on the first to third groups GR1 to GR3 has been completed. Therefore, partial data PD1 to PDk of the first group GR1 and first group migration complete data GMC1 are stored in the preliminary area 113b. In addition, partial data PD (k+1) to PD2k of the second group GR2 and second group migration complete data GMC2 are stored in the preliminary area 113b. Similarly, partial data PD(2k+1) to PD3k of the third group GR3 and third group migration complete data GMC3 are stored in the preliminary area 113b.

Meanwhile, since the SPO has occurred during the migration operation on the fourth group GR4, it is possible that only a portion of partial data PD(3k+1) to PD4k included in the fourth group GR4 may be stored in the preliminary area 113b. In the example shown in FIG. 15, it is illustrated that only partial data PD(3k+1) and PD(3k+2) among the partial data PD(3k+1) to PD4k included in the fourth group GR4 are stored in the preliminary area 113b. Since the data migration operation on the fourth group GR4 has not been completed, fourth group migration complete data GMC4 may not be stored in the preliminary area 113b.

In addition, partial data included in the fifth to qth groups GR5 to GRq and group migration complete data GMC5 to GMCq corresponding thereto may also not be stored in the preliminary area 113b.

Hereinafter, a method for resuming the data migration operation after SPO occurs will be described with reference to FIGS. 16, 17A, and 17B.

FIG. 16 is a flowchart illustrating a method of operating a memory system to recover a data migration operation when an SPO occurs during the data migration operation.

Referring to FIG. 16, the method of operating the memory system to recover the data migration operation includes step S310 of sensing or detecting a turn-on of the memory system, step S330 of scanning a preliminary area of a semiconductor memory device, step S350 of determining a spot at which the data migration operation is to be resumed, based on last group migration complete data stored in the preliminary area, and step S370 of resuming the data migration operation from the determined spot.

When the memory system is turned on (S310), the memory system determines whether a previous turn-off of the memory system is caused by an SPO or is a normal turn-off. When the memory system detects that the previous turn-off is caused by the SPO, the memory system may determine whether a data migration operation has been performed before the SPO. For the purpose of the determination, information on data migration may be recovered from system areas of the memory devices 100a and 100b. The information on the data migration may include information on target data and information on a destination area, i.e., the preliminary area 113b of the semiconductor memory device 100b.

When the memory system 1000 determines that the data migration operation has been performed before the SPO, the memory system 1000 may scan the preliminary area 113b of the semiconductor memory device 100b, based on the recovered information on the data migration (S330). In the scanning process, at least one group migration complete data included in the migration data 115c may be identified. In one embodiment, when the dedicated data pattern described with reference to FIG. 10 is included in read partial data, the corresponding partial data may be identified as group migration complete data. Subsequently, the memory system 1000 may determine which group the group migration complete data corresponding to is programmed in the preliminary area 113b, by identifying a group number.

When a plurality of group migration complete data are identified in step S330, in step S350, the memory system 1000 may determine a spot at which the data migration operation is to be resumed, based on the identified group migration complete data. When the group migration complete data are not identified in step S330, in step S350, the memory system 1000 may determine that the data migration operation is to be resumed from the beginning.

Subsequently, the memory system 1000 may resume the data migration operation from the spot determined in step S350 (S370). Hereinafter, the method of operating the memory system to recover the data migration operation will be described in detail with reference to FIGS. 17A and 17B.

Figure 17A:
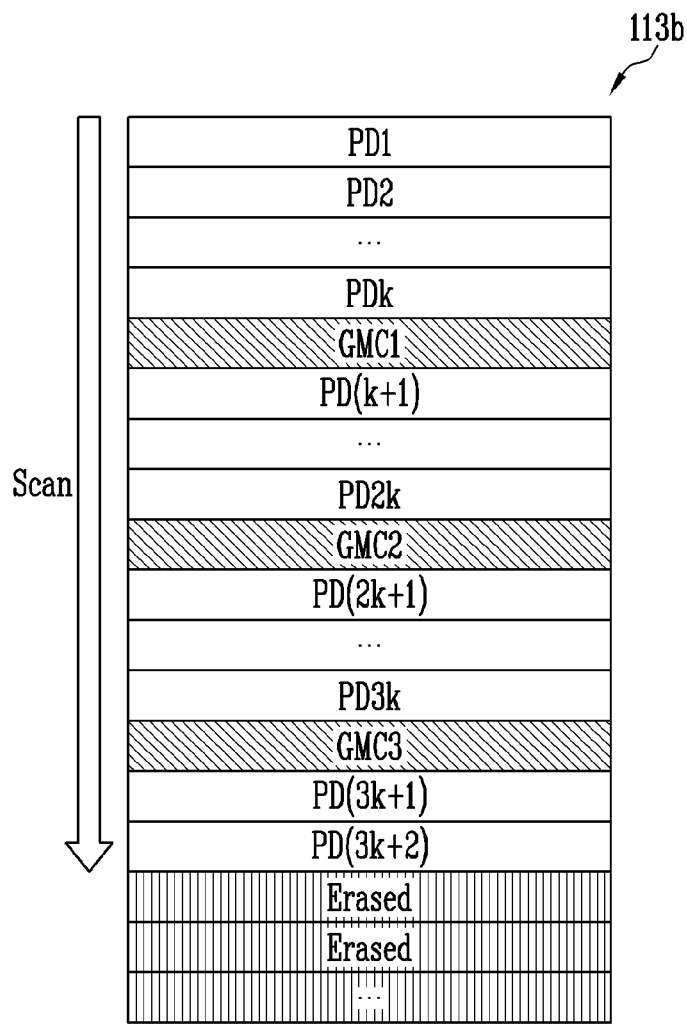
FIGS. 17A and 17B are diagrams illustrating the method of operating the memory system, which is shown in FIG. 16.
Figure 17B:
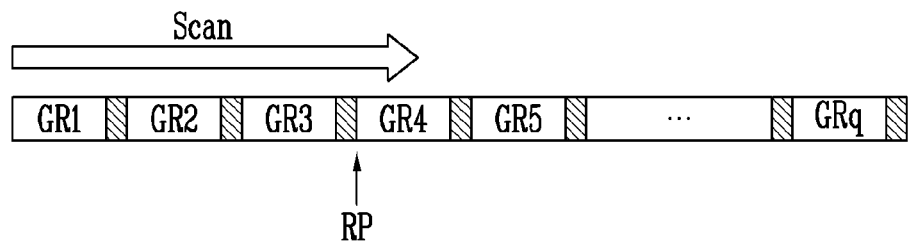

FIGS. 17A and 17B are diagrams illustrating the method of operating the memory system, which is shown in FIG. 16. More specifically, FIGS. 17A and 17B are diagrams illustrating steps S330, S350, and S370 shown in FIG. 16.

Referring to FIG. 17A, a scanning operation of the preliminary area 113b in a situation in which an SPO occurs during the data migration operation on the fourth group GR4 as described with reference to FIG. 15 is illustrated. FIG. 17B illustrates a scanning operation on the migration data 115c.

In step S330, the preliminary area 113b of the semiconductor memory device 100b may be scanned. Accordingly, the scanning operation is sequentially performed from a start position of the preliminary area 113b. The controller 200 of the memory system 1000 may sequentially read data stored in the preliminary area 113b. As shown in FIG. 17A, the partial data PD1 to PDk of the first group GR1 and the first group migration complete data GMC1 may be sequentially read. Subsequently, the partial data PD(k+1) to PD2k of the second group GR2 and the second group migration complete data GMC2 may be sequentially read from the preliminary area 113b. Subsequently, the partial data PD(2k+1) to PD3k of the third group GR3 and the third group migration complete data GMC3 may be sequentially read. Subsequently, the partial data PD(3k+1) and PD(3k+2) among the partial data PD(3k+1) to PD4k included in the fourth group GR4 may be sequentially read, and it may be read that a subsequent area is in an erase state.

The controller 200 may identify that the data migration operation has been normally completed from the data migration operation on the partial data PD(2k+1) to PD3k included in the third group GR3, based on the third group migration complete data GMC3 as last group migration complete data among the read group migration complete data. Accordingly, the partial data PD(3k+1) as a start position of the fourth group GR4 is determined as a start spot of the data migration operation.

It can be seen that the migration operation of the first to third groups has been completed by the scanning operation, and the migration operation of the fourth group has not been completed. Accordingly, it can be seen that the data migration operation is resumed from the start position of the fourth group GR4 (indicated by an arrow labeled "RP") as shown in FIG. 17B. The partial data PD(3k+1) and PD(3k+2) which were previously programmed in the preliminary area 113b may be invalidated. The partial data PD(3k+1) and PD(3k+2) may be again programmed at a new position. Subsequently, the data migration operation may be resumed by sequentially programming the partial data PD(3k+1) to PD4k and the fourth group migration complete data GMC4 in the preliminary area 113b. When the migration operation on the fourth group is completed, the data migration operation on the fifth to qth GR5 to GRq may also be sequentially performed.

Figure 18:
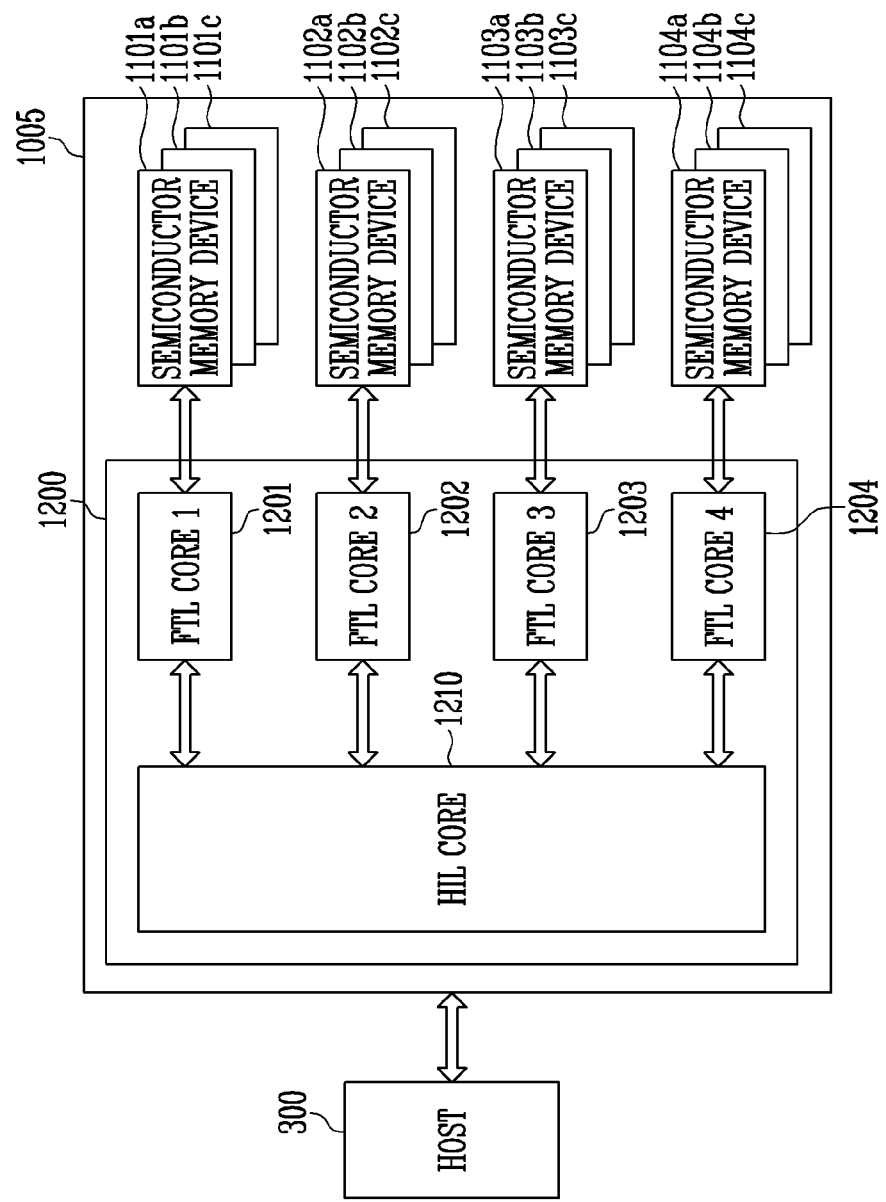
FIG. 18 is a block diagram illustrating a memory system according to another embodiment of the present disclosure.

FIG. 18 is a block diagram illustrating a memory system 1005 according to another embodiment of the present disclosure.

Referring to FIG. 18, the memory system 1005 includes a controller 1200 and a plurality of semiconductor memory devices 1101a to 1101c, 1102a to 1102c, 1103a to 1103c, and 1104a to 1104c. The controller 1200 includes a hardware interface layer (HIL) core 1210 and a plurality of flash translation layer (FTL) cores 1201 to 1204. The controller 1200 shown in FIG. 18 may include an additional buffer memory, but illustration of the additional buffer memory is omitted in FIG. 18.

A case where the controller 200 of the memory system 1000 shown in FIG. 7 includes the processing unit 201, the host interface 205, and the memory interface 207 has been illustrated. The host interface 205 may be implemented as an HIL core, and the memory interface 207 and the processing unit 201 may be implemented as a FTL core. That is, the controller 200 shown in FIG. 7 may include one FTL core and one HIL core.

However, a large-capacity solid state drive (SSD) may include a relatively large number of semiconductor memory devices 1101a to 1101c, 1102a to 1102c, 1103a to 1103c, and 1104a to 1104c. A plurality of FTL cores may be required to efficiently control a plurality of semiconductor memory devices. Therefore, as shown in FIG. 18, the controller 1200 may include an FTL core 1 1201 for controlling the semiconductor memory devices 1101a to 1101c, an FTL core 2 1202 for controlling the semiconductor memory devices 1102a to 1102c, an FTL core 3 1203 for controlling the semiconductor memory devices 1103a to 1103c, and an FTL core 4 1204 for controlling the semiconductor memory devices 1104a to 1104c. Also, the controller 1200 may further include the HIL core 1210 for controlling the FTL cores 1201 to 1204.

In FIG. 18, the term "core" may mean a functionally independent processing unit. That is, the HIL core 1210 and the plurality of TFL cores 1201 to 1204 may be physically implemented on one chip, but perform functions independently from each other.

Although a case where 12 semiconductor memory devices and four FTL cores are included in the memory system is illustrated in FIG. 18, the present disclosure is not limited thereto. It is to be understood that various numbers of semiconductor memory devices and FTL cores may be included in the memory system in accordance with the present disclosure. In the example shown in FIG. 18, the same number of semiconductor memory devices, i.e., four semiconductor memory devices are connected to each FTL core, but it is to be understood that the number is illustrative only and is chosen for describing the example embodiment and should not be limiting. In some embodiments, different numbers of semiconductor memory devices may be connected to the respective FTL cores.

In the memory system 1005 shown in FIG. 18, global wear leveling is more important. A deviation between use states of memory blocks included in a semiconductor memory device may become larger as the number of semiconductor memory devices included in the memory system 1005 becomes larger. Thus, write numbers (the numbers of write operations) between memory blocks included in a plurality of semiconductor memory devices can be equalized through the global wear leveling.

Figure 19:
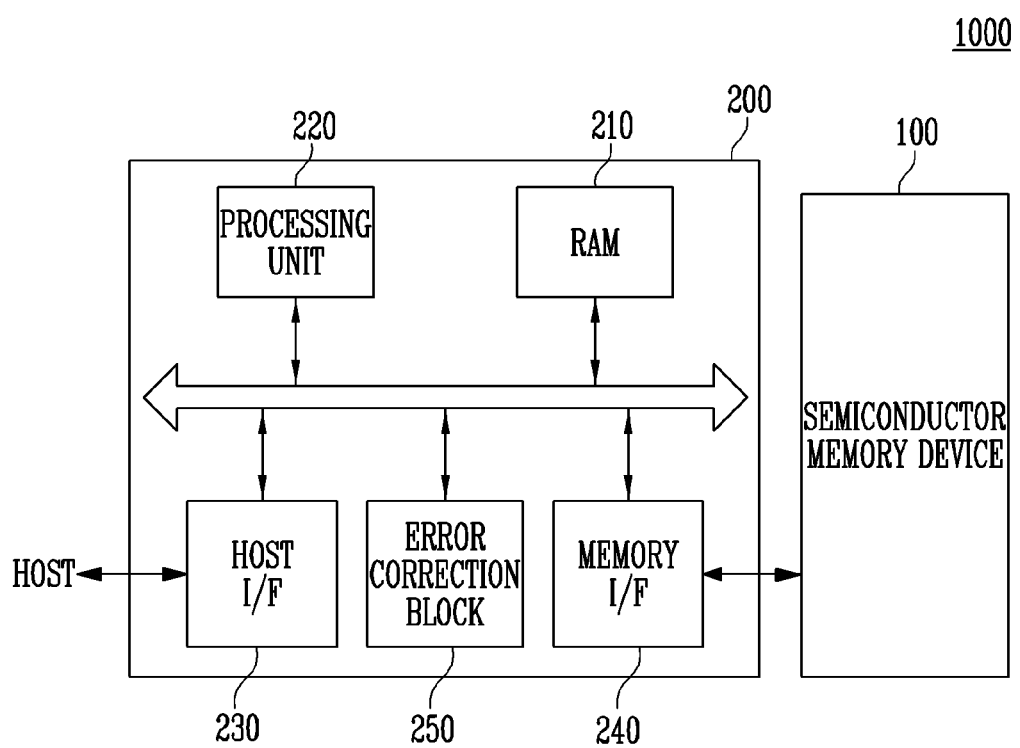
FIG. 19 is a block diagram illustrating an exemplary embodiment of a controller shown in FIG. 1.

FIG. 19 is a block diagram illustrating an example of the controller shown in FIG. 1.

Referring to FIG. 19, a controller 200 is connected to a semiconductor memory device 100 and a host HOST. The semiconductor memory device 100 may be the semiconductor memory device described with reference to FIG. 2. The controller 200 corresponds to the controller 200 shown in FIG. 1 or FIG. 7. Hereinafter, overlapping descriptions will be omitted.

The controller 200 accesses the semiconductor memory device 100 in response to a request from the host HOST. For example, the controller 200 controls read, write, erase, and background operations of the semiconductor memory device 100. The controller 200 provides an interface between the semiconductor memory device 100 and the host HOST. The controller 200 executes firmware for controlling the semiconductor memory device 100.

The controller 200 includes a random access memory (RAM) 210, a processing unit 220, a host interface (I/F) 230, a memory interface (I/F) 240, and an error correction block 250. The RAM 210 can be one of a working memory of the processing unit 220, a cache memory between the semiconductor memory device 100 and the host HOST, and a buffer memory between the semiconductor memory device 100 and the host HOST. The RAM 210 shown in FIG. 19 may be a component substantially identical to the buffer memory 203 shown in FIG. 7.

The processing unit 220 controls overall operations of the controller 200. The processing unit 220 shown in FIG. 19 may be a component substantially identical to the processing unit 201 shown in FIG. 7.

The host I/F 230 includes a protocol for exchanging data between the host HOST and the controller 200. In an exemplary embodiment, the controller 200 communicates with the host HOST through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol. The host I/F 230 shown in FIG. 19 may be a component substantially identical to the host interface 205 shown in FIG. 7.

The memory I/F 240 interfaces with the semiconductor memory device 100. For example, the memory I/F 240 may include a NAND interface or a NOR interface. The memory I/F 240 shown in FIG. 19 may be a component substantially identical to the memory interface 207 shown in FIG. 7.

The error correction block 250 is configured to detect and correct an error in data received from the semiconductor memory device 100 by using an error correction code (ECC). The processing unit 220 may control the semiconductor memory device 100 to adjust a read voltage, based an error detection result of the error correction block 250, and perform re-reading. In an exemplary embodiment, the error correction block 250 may be provided as a component of the controller 200.

The controller 200 and the semiconductor memory device 100 may be integrated into one semiconductor device. In an exemplary embodiment, the controller 200 and the semiconductor memory device 100 may be integrated into one semiconductor device, to constitute a memory card. For example, the controller 200 and the semiconductor memory device 100 may be integrated into one semiconductor device, to constitute a memory card such as a PC card (Personal Computer Memory Card International Association (PCMCIA)), a Compact Flash (CF) card, a Smart Media Card (SM or SMC), a memory stick, a Multi-Media Card (MMC, RS-MMC or MMCmicro), an SD Card (SD, miniSD, microSD or SDHC), or a Universal Flash Storage (UFS).

The controller 200 and the semiconductor memory device 100 may be integrated into one semiconductor device to constitute a semiconductor drive (solid state drive (SSD)). The semiconductor drive SSD includes a memory system 1000 configured to store data in a semiconductor memory. When the memory system 1000 including the controller 200 and the semiconductor memory device 100 is used as the semiconductor drive SSD, the operating speed of the host HOST connected to the memory system 1000 can be remarkably improved.

In another exemplary embodiment, the memory system 1000 including the controller 200 and the semiconductor memory device 100 may be provided as one of various components of an electronic device such as a computer, an Ultra Mobile PC (UMPC), a workstation, a net-book, a Personal Digital Assistant (PDA), a portable computer, a web tablet, a wireless phone, a mobile phone, a smart phone, an e-book, a Portable Multimedia Player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an exemplary embodiment, the semiconductor memory device 100 and the memory system including the same may be packaged in various forms. For example, the semiconductor memory device 100 or the memory system may be packaged in a manner such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CER-DIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi-Chip Package (MCP), Wafer-level Fabricated Package (WFP), or Wafer-level processed Stack Package (WSP).

Figure 20:
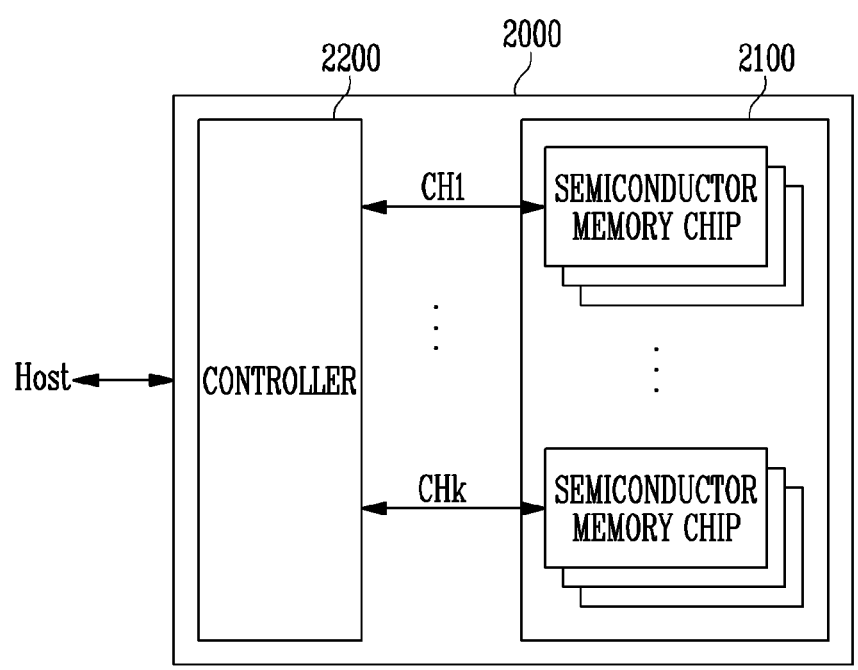
FIG. 20 is a block diagram illustrating an exemplary application of the memory system shown in FIG. 1.

FIG. 20 is a block diagram illustrating an application example of the memory system shown in FIG. 1.

Referring to FIG. 20, the memory system 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 20, there is illustrated a case where the plurality of groups communicate with the controller 2200 through first to kth channels CH1 to CHk. Each semiconductor memory chip may be configured and operated identically to the semiconductor memory device 100 described with reference to FIG. 2.

Each group communicates with the controller 2200 through one common channel. The controller 2200 is configured identically to the controller 200 described with reference to FIG. 19, and controls the plurality of memory chips of the semiconductor memory device 2100 through the plurality of channels CH1 to CHk.

Figure 21:
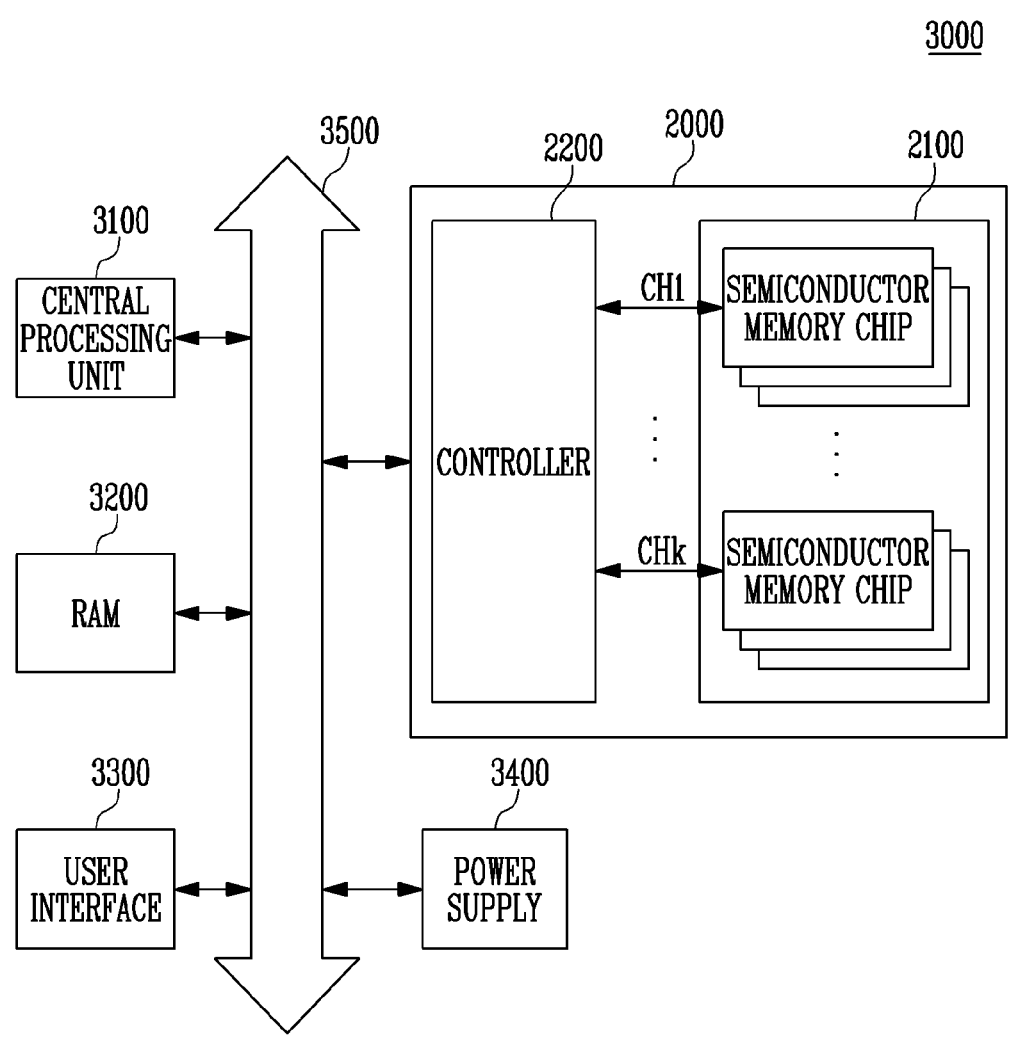
FIG. 21 is a block diagram illustrating a computing system including the memory system described with reference to FIG. 20.

FIG. 21 is a block diagram illustrating a computing system including the memory system described with reference to FIG. 20.

Referring to FIG. 21, the computing system 3000 includes a central processing unit 3100, a RAM 3200, a user interface 3300, a power supply 3400, a system bus 3500, and a memory system 2000.

The memory system 2000 is electrically connected to the central processing unit 3100, the RAM 3200, the user interface 3300, and the power supply 3400 through the system bus 3500. Data supplied through the user interface 3300 or data processed by the central processing unit 3100 are stored in the memory system 2000.

In FIG. 21, there is illustrated a case where the semiconductor memory device 2100 is connected to the system bus 3500 through the controller 2200. However, the semiconductor memory device 2100 may be directly connected to the system bus 3500. The function of the controller 2200 may be performed by the central processing unit 3100 and the RAM 3200.

In FIG. 21, there is illustrated a case where the memory system 2000 described with reference to FIG. 20 is provided. However, the memory system 2000 may be replaced by the memory system including the controller 200 and the semiconductor memory device 100, which is described with reference to FIG. 19.

In accordance with the present disclosure, a memory system capable of stably performing a data migration operation even when a power supply is interrupted and a method of operating the memory system are provided.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

The exemplary embodiments of the present disclosure have been described in the drawings and specification. Although specific terminologies are used here, they serve only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory system comprising:
   first and second semiconductor memory devices each including a preliminary area used for a data migration operation of migrating data stored in one of the first and second semiconductor memory devices to the other of the first and second semiconductor memory devices; and
   a controller coupled to the first and second semiconductor memory devices and configured to:
   determine the data migration operation on target data including a plurality of partial target data stored in the first semiconductor memory device;
   control the first semiconductor memory device to read the plurality of partial target data;
   group the plurality of partial target data into a plurality of data groups;
   generate first group migration complete data of a first data group among the plurality of data groups, wherein the first group migration complete data indicates that the data migration operation of the first data group has been completed;
   generate second group migration complete data of a second data group among the plurality of data groups, wherein the second group migration complete data indicates that the data migration operation of the second data group has been completed;
   control the second semiconductor memory device to sequentially program the first data group and the first group migration complete data in the preliminary area of the second semiconductor memory device; and
   control the second semiconductor memory device to sequentially program the second data group and the second group migration complete data in the preliminary area of the second semiconductor memory device after the first data group and the first group migration complete data are sequentially stored in the preliminary area of the second semiconductor memory device.

2. The memory system of claim 1, wherein a group migration complete data among a plurality of group migration complete data comprises:
   a dedicated data pattern for identifying the group migration complete data; and
   a group number representing a data group corresponding to the group migration complete data.

3. The memory system of claim 1, wherein the first and second semiconductor memory devices each include a normal area, and wherein the controller is further configured to perform:
   a first write operation corresponding to a write request received from a host in the normal area of the first semiconductor memory device or the second semiconductor memory device; and a second write operation corresponding to the data migration operation internally determined in the memory system in the preliminary area of the first semiconductor memory device or the second semiconductor memory device.

4. The memory system of claim 1, wherein the controller is further configured to:
scan the preliminary area of the second semiconductor memory device by detecting a turn-on of the memory system; and
determine a data group to resume the data migration operation among a plurality of data groups, based on last group migration complete data stored in the preliminary area of the second semiconductor memory device.

5. The memory system of claim 4, wherein the controller is further configured to determine a next data group of a data group corresponding to the last group migration complete data as the data group to resume the data migration operation.

6. The memory system of claim 4, wherein the controller is further configured to control the first and second semiconductor memory devices to resume the data migration operation, based on the determined data group.

7. The memory system of claim 1, wherein the controller comprises:
a memory interface configured to transfer commands and data to the first and second semiconductor memory devices and receive data from the first and second semiconductor memory devices;
a buffer memory configured to temporarily store the plurality of read partial target data; and
a processing unit configured to control the data migration operation.

8. The memory system of claim 1, wherein the controller comprises:
a first flash translation layer core configured to transfer first commands and first data to the first semiconductor memory device and receive data from the first semiconductor memory device;
a second flash translation layer core configured to transfer second commands and second data to the second semiconductor memory device, and receive data from the second semiconductor memory device; and
a host interface layer core configured to control the first flash translation layer core and the second flash translation layer core, interface an external host and the memory system, and control the data migration operation.

9. A method of operating a memory system including first and second semiconductor memory devices each including a preliminary area used for a data migration operation of migrating data stored in one of the first and second semiconductor memory devices to the other of the first and second semiconductor memory devices, the method comprising:
determining target data including a plurality of partial target data among data stored in the first semiconductor memory device;
reading the plurality of partial target data from the first semiconductor memory device;
grouping the plurality of partial target data into a plurality of data groups;
generating first group migration complete data of a first data group among the plurality of data groups, wherein the first group migration complete data indicates that the data migration operation of the first data group has been completed;
generating second group migration complete data of a second data group among the plurality of data groups, wherein the second group migration complete data indicates that the data migration operation of the second data group has been completed;
sequentially storing the first data group and the first group migration complete data in the preliminary area of the second semiconductor memory device; and
sequentially storing the second data group and the second group migration complete data in the preliminary area of the second semiconductor memory device after the first data group and the first group migration complete data are sequentially stored in the preliminary area of the second semiconductor memory device.

10. The method of claim 9, wherein a group migration complete data among a plurality of group migration complete data comprises:
a dedicated data pattern for identifying the group migration complete data; and
a group number corresponding to the group migration complete data.

11. The method of claim 9, wherein the first and second semiconductor memory devices each include a normal area, and the method further comprising:
performing a write operation corresponding to a write request received from a host in the normal area of the first semiconductor memory device or the second semiconductor memory device; and
performing a write operation corresponding to the data migration operation internally determined in the memory system in the preliminary area of the first semiconductor memory device or the second semiconductor memory device.

12. A method for operating a memory system including first and second semiconductor memory devices each including and a preliminary area used for a data migration operation of migrating data stored in one of the first and second semiconductor memory devices to the other of the first and second semiconductor memory devices, the method comprising:
detecting a turn-on of the memory system;
determining that the data migration operation of a plurality of data groups each comprising a plurality of partial target data was being performed from the first semiconductor memory device to the second semiconductor memory device before the memory system has been turned off;
scanning the preliminary area of the second semiconductor memory device, in which at least one data group for which the data migration operation has been completed among the plurality of data groups and at least one group migration complete data corresponding to the at least one data group are sequentially stored, the at least one group migration complete data indicating that the data migration operation of the at least one data group has been completed; and
determining a data group to resume the data migration operation of remaining data groups excluding the at least one data group among the plurality of data groups, based on last group migration complete data among the at least one group migration complete data stored in the preliminary area of the second semiconductor memory device.

13. The method of claim 12, wherein the first and second semiconductor memory devices each include a normal area, and wherein the normal area is a first area in which a write operation corresponding to a write request received from a host is performed, and the preliminary area is a second area in which a write operation corresponding to the data migration operation internally determined in the memory system is performed.

14. The method of claim 12, wherein determining the data group comprises:
   checking the last group migration complete data; and
   determining a next data group to a data group corresponding to the last group migration complete data as the data group to resume the data migration operation.

15. The method of claim 12, further comprising resuming the data migration operation based on the determined data group.

16. The method of claim 12, wherein the at least one group migration complete data is located posterior to a corresponding group.

17. The method of claim 16, wherein a group migration complete data comprises:
   a dedicated data pattern for identifying the group migration complete data; and
   a group number representing a data group corresponding to the group migration complete data.

* * * * *